United States Patent
Wu et al.

(10) Patent No.: US 10,225,191 B2
(45) Date of Patent: Mar. 5, 2019

(54) SERVICE PACKET DISTRIBUTION METHOD AND APPARATUS

(71) Applicant: HUAWEI TECHNOLOGIES CO., LTD., Shenzhen (CN)

(72) Inventors: Erhua Wu, Shenzhen (CN); Xiaofeng Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 83 days.

(21) Appl. No.: 15/381,158

(22) Filed: Dec. 16, 2016

(65) Prior Publication Data
US 2017/0099221 A1    Apr. 6, 2017

Related U.S. Application Data

(63) Continuation of application No. PCT/CN2014/079939, filed on Jun. 16, 2014.

(51) Int. Cl.
*H04L 12/741*    (2013.01)
*H04L 29/08*    (2006.01)
(Continued)

(52) U.S. Cl.
CPC .............. *H04L 45/745* (2013.01); *G06F 9/00* (2013.01); *H04L 12/00* (2013.01);
(Continued)

(58) Field of Classification Search
CPC .... H04L 45/745; H04L 67/141; H04L 67/148
See application file for complete search history.

(56) References Cited

U.S. PATENT DOCUMENTS 8,612,612 B1 *  12/2013  Dukes ................... H04L 67/14
                                                     370/230
9,001,821 B1 *   4/2015  Shah ................. H04W 36/0022
                                                     370/352
(Continued)

FOREIGN PATENT DOCUMENTS

CN    101400029 A    4/2009
CN    102882973 A    1/2013

OTHER PUBLICATIONS

International Search Report dated Feb. 26, 2015 in WIPO Application No. PCT/CN2014/079939 (with English Abstract).
(Continued)

*Primary Examiner* — Rasheed Gidado
(74) *Attorney, Agent, or Firm* — Oblon, McClelland, Maier & Neustadt, L.L.P.

(57) ABSTRACT

Embodiments of the present application relate to a service packet distribution method and an apparatus. The method includes: receiving, by a service packet processing node located in a cloud gateway, a session request signal sent by a peer device of the cloud gateway; establishing a user bearer according to the session request signal and allocating a user bearer index used to identify the user bearer, where the user bearer index includes a location index value, the location index value is used to indicate a location of the service packet processing node in a location table of a packet distribution node located in the cloud gateway, and the location table includes a correspondence between a location index value and an identifier of a service packet processing node; and sending a session response signal to the peer device, where the session response signal includes the user bearer index.

18 Claims, 11 Drawing Sheets

(51) Int. Cl.
| | |
|---|---|
| *H04L 12/24* | (2006.01) |
| *G06F 9/00* | (2006.01) |
| *H04L 12/00* | (2006.01) |
| *H04W 4/18* | (2009.01) |
| *H04W 88/16* | (2009.01) |
| *H04W 76/12* | (2018.01) |

(52) U.S. Cl.
CPC ........ *H04L 41/0823* (2013.01); *H04L 67/141* (2013.01); *H04L 67/148* (2013.01); *H04L 67/28* (2013.01); *H04W 4/18* (2013.01); *H04W 76/12* (2018.02); *H04W 88/16* (2013.01)

(56) References Cited

U.S. PATENT DOCUMENTS

| | | | |
|---|---|---|---|
| 9,071,927 B2* | 6/2015 | Bogineni | H04W 8/02 |
| 2006/0018304 A1 | 1/2006 | Nguyen et al. | |
| 2011/0286465 A1* | 11/2011 | Koodli | H04W 68/00 370/401 |
| 2012/0202491 A1* | 8/2012 | Fox | H04B 7/2609 455/435.1 |
| 2014/0198798 A1* | 7/2014 | Akiyoshi | H04W 76/10 370/392 |

OTHER PUBLICATIONS

International Search Report dated Feb. 26, 2015 in PCT/CN2014/079939 (with English translation and English translation of Category of Cited Documents).

* cited by examiner

SERVICE PACKET DISTRIBUTION METHOD AND APPARATUS

CROSS-REFERENCE TO RELATED APPLICATIONS

This application is a continuation application of international application number PCT/CN2014/079939 filed on Jun. 16, 2014, the disclosure of which is hereby incorporated by reference in its entirety.

TECHNICAL FIELD

The present application relates to the field of communications technologies, and in particular, to a service packet distribution method and an apparatus.

BACKGROUND

With rapid development of technologies such as information technologies (IT for short), virtualization, software-defined networking (SDN for short), and cloud computing, a mobile operator separates a data plane from a control plane by using a Network Functions Virtualization (NFV for short) technology, so as to cope with network impact from an Internet service provider. By deploying a standardized network hardware platform in a mobile network device, the mobile operator can add or control a virtual device according to a requirement of the mobile operator, and provide various differentiated applications and services on this basis, which greatly shortens a development cycle.

In the mobile broadband field, a cloud packet service gateway (cloud gateway for short) is an anchor point of a mobile data service. The cloud gateway processes signaling to set up a service bearer link and also processes uplink and downlink data service streams of a user. Therefore, the cloud gateway is a service node device characterized by a large quantity of users and high-performance forwarding.

The cloud gateway is a soft/hardware product that operates on a general server hardware platform in a cloud computing environment, and implements gateway functions defined in a $3^{rd}$ Generation Partnership Project (3GPP for short) standard, such as a gateway general packet radio service (GPRS for short) support node (GGSN for short), a serving gateway (S-GW for short), and a packet data network (PDN for short) gateway (P-GW for short).

In the prior art, an operating process of a cloud gateway is specifically as follows: The cloud gateway receives a service packet, queries a domain name system (DNS) by using a mobility management entity (MME) and an access point name (APN for short), so as to obtain an address list of each service packet processing node, and selects, from the address list according to an IP address carried in the service packet, a service packet processing node corresponding to the IP address carried in the service packet to process the received service packet, thereby implementing distribution processing performed by the cloud gateway on the service packet.

However, the distribution processing performed by the cloud gateway on the service packet in the prior art has the following disadvantages: If a service packet processing node is faulty but the cloud gateway still selects a service packet processing node according to an IP address carried in a service packet to perform distribution processing on the service packet, it is possible that the cloud gateway selects the faulty service processing node to process the service packet, causing a distribution failure. Therefore, how to improve a success rate of service packet distribution of the cloud gateway is a problem to be resolved currently.

SUMMARY

In view of this, embodiments of the present disclosure provide a service packet distribution method and an apparatus, so as to implement flexible service packet distribution of a cloud gateway and improve service packet distribution efficiency of the cloud gateway.

According to a first aspect, an embodiment of the present disclosure provides a service packet distribution method, where the method includes:

receiving, by a service packet processing node located in a cloud gateway, session request signaling sent by a peer device of the cloud gateway;

establishing, by the service packet processing node, a user bearer according to the session request signaling, and allocating a user bearer index used to identify the user bearer, where the user bearer index includes a location index value, the location index value is used to indicate a location of the service packet processing node in a location table of a packet distribution node located in the cloud gateway, and the location table includes a correspondence between a location index value and an identifier of a service packet processing node; and sending, by the service packet processing node, session response signaling to the peer device, where the session response signaling includes the user bearer index, so that the peer device adds the user bearer index into a service packet when sending the service packet to the packet distribution node, and the packet distribution node determines, according to the location index value and the location table after receiving the service packet, the service packet processing node for processing the service packet.

In a first possible implementation manner, the location table is established by the packet distribution node according to a correspondence that is sent by the service packet processing node and is between the location index value allocated by the service packet processing node and an identifier of the service packet processing node.

With reference to the first possible implementation manner of the first aspect, in a second possible implementation manner, when a service packet processing node in the other service packet processing node(s) in the cloud gateway is to be migrated out of the cloud gateway, the method further includes:

receiving, by the service packet processing node, a migration message sent by a management node in the cloud gateway, where the migration message includes an identifier of the to-be-migrated-out service packet processing node;

determining, by the service packet processing node, a location index value corresponding to the identifier of the to-be-migrated-out service packet processing node according to the identifier of the to-be-migrated-out service packet processing node and correspondences respectively between location index values of the other service packet processing node(s) and identifiers of the other service packet processing node(s); and sending, by the service packet processing node, a correspondence between the location index value corresponding to the identifier of the to-be-migrated-out service packet processing node and the identifier of the service packet processing node(s) to the packet distribution node, so that the packet distribution node updates a correspondence related to the location index value corresponding to the identifier of the to-be-migrated-out service packet processing node in the location table.

With reference to the first aspect, or the first or second possible implementation manner of the first aspect, in a third possible implementation manner, in a 2G network or a 3G network, the cloud gateway is a GGSN, and the peer device is an SGSN; or in a 4$^{th}$ generation mobile communications technology (4G for short) network, the cloud gateway is a P-GW or an S-GW, and the peer device is an MME; or in a 4G roaming network, the cloud gateway is a P-GW or an S-GW, and the peer device is an evolved packet data gateway (ePDG for short).

With reference to the first aspect, or the first, second, or third possible implementation manner of the first aspect, in a fourth possible implementation manner, the user bearer index is specifically a tunnel endpoint identifier (TEID for short) or a Generic Routing Encapsulation (GRE for short) key.

With reference to the first aspect, or the first, second, third, or fourth possible implementation manner of the first aspect, in a fifth possible implementation manner, some consecutive bits in the user bearer index are used to save the location index value.

According to a second aspect, an embodiment of the present disclosure provides a service packet distribution method, where the method includes:

receiving, by a packet distribution node located in a cloud gateway, a service packet sent by a peer device of the cloud gateway, where the service packet includes a user bearer index, the user bearer index is sent to the peer device by a service packet processing node located in the cloud gateway, the user bearer index includes a location index value, the location index value is used to indicate a location of the service packet processing node located in the cloud gateway in a location table of the packet distribution node, and the location table includes a correspondence between a location index value and an identifier of a service packet processing node;

determining, by the packet distribution node according to the location index value and the location table, the service packet processing node for processing the service packet; and sending, by the packet distribution node, the service packet to the determined service packet processing node, so that the service packet processing node performs processing on the service packet.

In a first possible implementation manner, the location table is established by the packet distribution node according to a correspondence that is sent by the service packet processing node and is between the location index value allocated by the service packet processing node and an identifier of the service packet processing node.

With reference to the first possible implementation manner of the second aspect, in a second possible implementation manner, when a service packet processing node in the other service packet processing node(s) in the cloud gateway is to be migrated out of the cloud gateway, the method further includes:

receiving, by the packet distribution node, a correspondence that is sent by the service packet processing node and is between a location index value corresponding to an identifier of the to-be-migrated-out service packet processing node and an identifier of the service packet processing node; and updating, by the packet distribution node based on the correspondence between the location index value corresponding to the identifier of the to-be-migrated-out service packet processing node and the identifier of the service packet processing node, a correspondence related to the location index value corresponding to the to-be-migrated-out service packet processing node in the location table.

With reference to the second aspect, or the first or second possible implementation manner of the second aspect, in a third possible implementation manner:

in a 2G network or a 3G network, the cloud gateway is a GGSN, and the peer device is an SGSN; or in a 4G network, the cloud gateway is a P-GW or an S-GW, and the peer device is an MME; or in a 4G roaming network, the cloud gateway is a P-GW or an S-GW, and the peer device is an ePDG.

With reference to the second aspect, or the first, second, or third possible implementation manner of the second aspect, in a fourth possible implementation manner, the user bearer index is specifically a TEID or a GRE key.

With reference to the second aspect, or the first, second, third, or fourth possible implementation manner of the second aspect, in a fifth possible implementation manner, some consecutive bits in the user bearer index are used to save the location index value.

According to a third aspect, an embodiment of the present disclosure provides a service packet distribution method, where the method includes:

sending, by a peer device of a cloud gateway, session request signaling to a service packet processing node located in the cloud gateway;

receiving, by the peer device, session response signaling sent by the service packet processing node, where the session response signaling carries a user bearer index, the user bearer index is used to identify a user bearer established according to the session request signaling, the user bearer index includes a location index value, the location index value is used to indicate a location of the service packet processing node in a location table of a packet distribution node located in the cloud gateway, and the location table includes a correspondence between a location index value and an identifier of a service packet processing node; and sending, by the peer device, a service packet to the packet distribution node, where the service packet carries the user barer index, so that the packet distribution node determines, according to the location index value and the location table, the service packet processing node for processing the service packet, and sends the service packet to the service packet processing node for processing the service packet.

In a first possible implementation manner, in a 2G network or a 3G network, the cloud gateway is a GGSN, and the peer device is an SGSN; or in a 4G network, the cloud gateway is a P-GW or an S-GW, and the peer device is an MME; or in a 4G roaming network, the cloud gateway is a P-GW or an S-GW, and the peer device is an ePDG.

With reference to the third aspect, or the first possible implementation manner of the third aspect, in a second possible implementation manner, the user bearer index is specifically a TEID or a GRE key.

With reference to the second possible implementation manner of the third aspect, in a third possible implementation manner, that the user bearer index includes a location index value includes:

some consecutive bits in the user bearer index are used to save the location index value.

According to a fourth aspect, an embodiment of the present disclosure provides a service packet processing node, where the service packet processing node is located in a cloud gateway, and the service packet processing node includes:

a receiving module, configured to receive session request signaling sent by a peer device of the cloud gateway;

a processing module, configured to establish a user bearer according to the session request signaling, and allocate a user bearer index used to identify the user bearer, where the user bearer index includes a location index value, the location index value is used to indicate a location of the service packet processing node in a location table of a packet distribution node located in the cloud gateway, and the location table includes a correspondence between a location index value and an identifier of a service packet processing node; and a sending module, configured to send session response signaling to the peer device, where the session response signaling includes the user bearer index, so that the peer device adds the user bearer index into a service packet when sending the service packet to the packet distribution node, and the packet distribution node determines, according to the location index value and the location table after receiving the service packet, the service packet processing node for processing the service packet.

In a first possible implementation manner, the location table is established by the packet distribution node according to a correspondence that is sent by the sending module and is between the location index value allocated by the processing module and an identifier of the service packet processing node.

With reference to the first possible implementation manner of the fourth aspect, in a second possible implementation manner, when a service packet processing node in the other service packet processing node(s) in the cloud gateway is to be migrated out of the cloud gateway, the receiving module is further configured to receive a migration message sent by a management node in the cloud gateway, where the migration message includes an identifier of the to-be-migrated-out service packet processing node;

the processing module is further configured to determine a location index value corresponding to the identifier of the to-be-migrated-out service packet processing node according to the identifier of the to-be-migrated-out service packet processing node and correspondences respectively between location index values of the other service packet processing node(s) and identifiers of the other service packet processing node(s);

the sending module is further configured to send a correspondence between the location index value corresponding to the identifier of the to-be-migrated-out service packet processing node and the identifier of the service packet processing node to the packet distribution node, so that the packet distribution node updates a correspondence related to the location index value corresponding to the identifier of the to-be-migrated-out service packet processing node in the location table.

With reference to the fourth aspect, or the first or second possible implementation manner of the fourth aspect, in a third possible implementation manner, in a 2G network or a 3G network, the cloud gateway is a GGSN, and the peer device is an SGSN; or in a 4G network, the cloud gateway is a P-GW or an S-GW, and the peer device is an MME; or in a 4G roaming network, the cloud gateway is a P-GW or an S-GW, and the peer device is an ePDG.

With reference to the fourth aspect, or the first, second, or third possible implementation manner of the fourth aspect, in a fourth possible implementation manner, the user bearer index is specifically a TEID or a GRE key.

With reference to the fourth aspect, or the first, second, third, or fourth possible implementation manner of the fourth aspect, in a fifth possible implementation manner, some consecutive bits in the user bearer index allocated by the processing module are used to save the location index value.

According to a fifth aspect, an embodiment of the present disclosure provides a packet distribution node, where the packet distribution node is located in a cloud gateway, and the packet distribution node includes:

a receiving module, configured to receive a service packet sent by a peer device of the cloud gateway, where the service packet includes a user bearer index, the user bearer index is sent to the peer device by a service packet processing node located in the cloud gateway, the user bearer index includes a location index value, the location index value is used to indicate a location of the service packet processing node located in the cloud gateway in a location table of the packet distribution node, and the location table includes a correspondence between a location index value and an identifier of a service packet processing node;

a processing module, configured to determine, according to the location index value and the location table, the service packet processing node for processing the service packet; and a sending module, configured to send the service packet to the determined service packet processing node, so that the service packet processing node performs processing on the service packet.

In a first possible implementation manner, the location table is established by the processing module according to a correspondence that is sent by the service packet processing node and is between the location index value allocated by the service packet processing node and an identifier of the service packet processing node.

With reference to the first possible implementation manner of the fifth aspect, in a second possible implementation manner, when a service packet processing node in the other service packet processing node(s) in the cloud packet is to be migrated out of the cloud gateway, the receiving module is further configured to receive a correspondence that is sent by the service packet processing node and is between a location index value corresponding to an identifier of the to-be-migrated-out service packet processing node and an identifier of the service packet processing node; and the processing module is further configured to update, based on the correspondence between the location index value corresponding to the identifier of the to-be-migrated-out service packet processing node and the identifier of the service packet processing node, a correspondence related to the location index value corresponding to the to-be-migrated-out service packet processing node in the location table.

With reference to the fifth aspect, or the first or second possible implementation manner of the fifth aspect, in a third possible implementation manner, in a y 2G network or a 3G network, the cloud gateway is a GGSN, and the peer device is an SGSN; or in a 4G network, the cloud gateway is a P-GW or an S-GW, and the peer device is an MME; or in a 4G roaming network, the cloud gateway is a P-GW or an S-GW, and the peer device is an ePDG.

With reference to the fifth aspect, or the first, second, or third possible implementation manner of the fifth aspect, in a fourth possible implementation manner, the user bearer index included in the service packet received by the receiving module is specifically a TEID or a GRE key.

With reference to the fifth aspect, or the first, second, third, or fourth possible implementation manner of the fifth aspect, in a fifth possible implementation manner, some consecutive bits in the user bearer index included in the service packet received by the receiving module are used to save the location index value.

According to a sixth aspect, an embodiment of the present disclosure provides a peer device, where the peer device includes:

a sending module, configured to send session request signaling to a service packet processing node located in a cloud gateway; and a receiving module, configured to receive session response signaling sent by the service packet processing node, where the session response signaling carries a user bearer index, the user bearer index is used to identify a user bearer established according to the session request signaling, the user bearer index includes a location index value, the location index value is used to indicate a location of the service packet processing node in a location table of a packet distribution node located in the cloud gateway, and the location table includes a correspondence between a location index value and an identifier of a service packet processing node; where the sending module is further configured to send a service packet to the packet distribution node, where the service packet carries the user barer index, so that the packet distribution node determines, according to the location index value and the location table, the service packet processing node for processing the service packet, and sends the service packet to the service packet processing node for processing the service packet.

In a first possible implementation manner, in a 2G network or a 3G network, the cloud gateway is a GGSN, and the peer device is an SGSN; or in a 4G network, the cloud gateway is a P-GW or an S-GW, and the peer device is an MME; or in a 4G roaming network, the cloud gateway is a P-GW or an S-GW, and the peer device is an ePDG.

With reference to the sixth aspect, or the first possible implementation manner of the sixth aspect, in a second possible implementation manner, the user bearer index carried in the session response signaling received by the receiving module is specifically a tunnel endpoint identifier TEID or a Generic Routing Encapsulation key GRE Key.

With reference to the sixth aspect or the second possible implementation manner of the sixth aspect, in a third possible implementation manner, that the user bearer index carried in the session response signaling received by the receiving module includes a location index value includes:

some consecutive bits in the user bearer index carried in the session response signaling received by the receiving module are used to save the location index value.

In the foregoing solutions, a service packet processing node allocates a location index value to a peer device and notifies the peer device of the location index value, so that the peer device includes the location index value into a service packet when sending the service packet to a packet distribution node, and the packet distribution node determines, according to the location index value and a location table, the service packet processing node for processing the service packet. The prior art has the following problem: When performing distribution processing on a service packet, a cloud gateway selects a service packet processing node according to only an IP address carried in the service packet, which is inflexible and easily causes a situation in which the selected service packet processing node cannot perform processing on the service packet, thereby leading to service packet distribution failures of the cloud gateway and reducing a distribution success rate. In the foregoing solutions, the location index value is allocated by the service packet processing node, which resolves the problem in the prior art, implements flexible service packet distribution of the cloud gateway, and improves a service packet distribution success rate of the cloud gateway.

DESCRIPTION OF EMBODIMENTS

To make the objectives, technical solutions, and advantages of the present application clearer, the following further describes the present application in detail with reference to the accompanying drawings. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present application.

Figure 1:
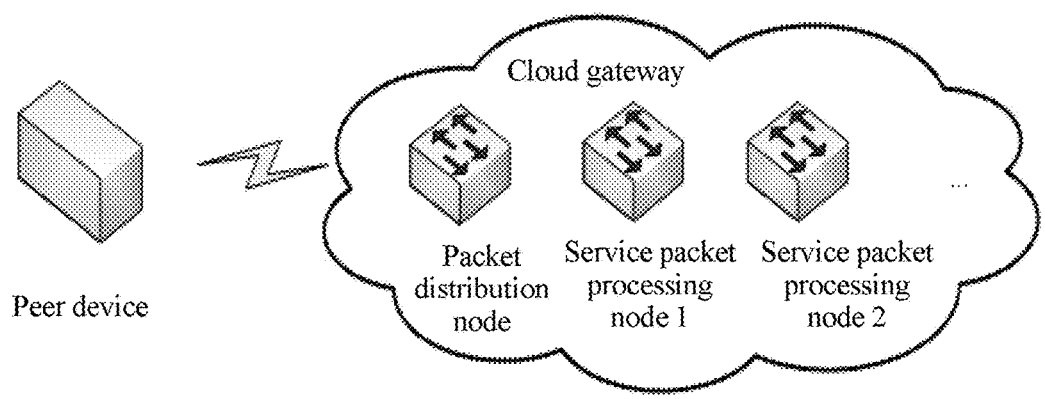
FIG. 1 is a diagram of a service packet distribution network architecture according to an embodiment of the present disclosure.

The following uses FIG. 1 as an example to describe in detail a service packet distribution system provided in an embodiment of the present disclosure. FIG. 1 is a diagram of a service packet distribution network architecture according to this embodiment of the present disclosure. As shown in FIG. 1, the network architecture may be applied to a service packet distribution scenario, and the network architecture includes a peer device and a cloud gateway. The cloud gateway includes a packet distribution node and a service packet processing node.

In this embodiment of the present disclosure, the peer device is a device directly connected to the cloud gateway physically or logically.

Figure 2:
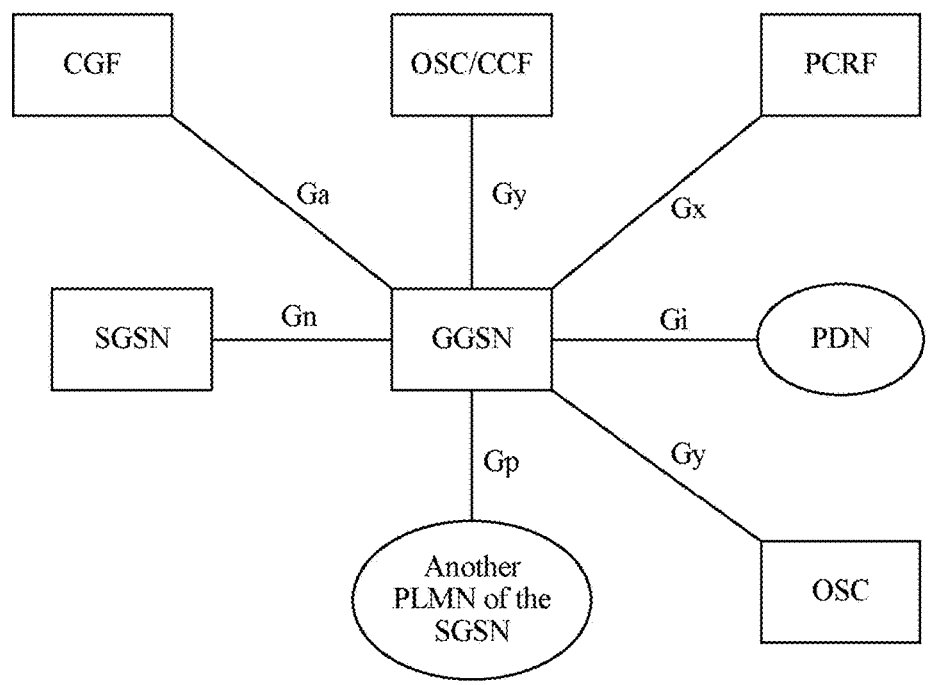
FIG. 2 is a schematic diagram of an interface when a cloud gateway serves in a GGSN form in a 2G or 3G network.

An implementation manner of the cloud gateway varies with a network environment. As shown in FIG. 2, in a 2G network or a 3G network, the cloud gateway serves as a GGSN and transmits signaling and service packets to peripheral network elements by using different interaction interfaces, and the peer device is an SGSN. In a 4G network, the cloud gateway serves an S-GW or a P-GW, and the peer device is an MME; or in a 4G roaming network, the cloud gateway is a P-W or an S-GW, and the peer device is an ePDG.

The packet distribution node is a subsystem of the cloud gateway, and primarily implements signaling and service packet identification and distribution, so as to distribute signaling and service packets of different peer devices to different service packet processing nodes for processing.

The service packet processing node is another subsystem of the cloud gateway, and primarily implements signaling and service packet processing. Signaling processing generally includes: establishing a user bearer context according to session request signaling sent by the peer device, and returning response signaling according to whether the processing is successful. Service packet processing includes performing service identification, service control, service billing, packet protocol format conversion, and the like on uplink/downlink service packets sent by the peer device.

The cloud gateway includes at least one packet distribution node and at least two service packet processing nodes; one packet distribution node may correspond to at least two service packet processing nodes.

After receiving the session request signaling sent by the peer device, the service packet processing node establishes a user bearer, and allocates a user bearer index used to identify the user bearer, where the user bearer index includes a location index value. The service packet processing node sends the user bearer index to the peer device by including the use bearer index into session response signaling. The peer device obtains the user bearer index from the session response signaling, includes the user bearer index into a service packet, and sends the service packet to the packet distribution node. After receiving the service packet, the packet distribution node obtains the location index value from the user bearer index carried in the service packet, and determines, according to the location index value and a location table, the service packet processing node for processing the service packet.

In this embodiment of the present disclosure, the location index value is used to indicate a location of the service packet processing node in the location table of the packet distribution node; the location table includes a correspondence between a location index value and an identifier of a service packet processing node. The user bearer index may be used as a search keyword for searching and obtaining the user bearer context.

The user bearer context is specifically a data structure that stores information about user equipment that performs interactive communication with the peer device, and the user bearer context is used to indicate information related to the user equipment. For example, the user bearer context may specifically include an IP address of the user equipment, an access point name (APN for short) for access by the user equipment, type information of the user equipment, data traffic that the user equipment allows to send, and a priority of the user equipment.

The packet distribution node performs distribution on the service packet according to the location index value allocated by the service packet processing node, so that the packet distribution node can flexibly determine the service packet processing node for processing the service packet, which improves service packet distribution efficiency.

Figure 3:
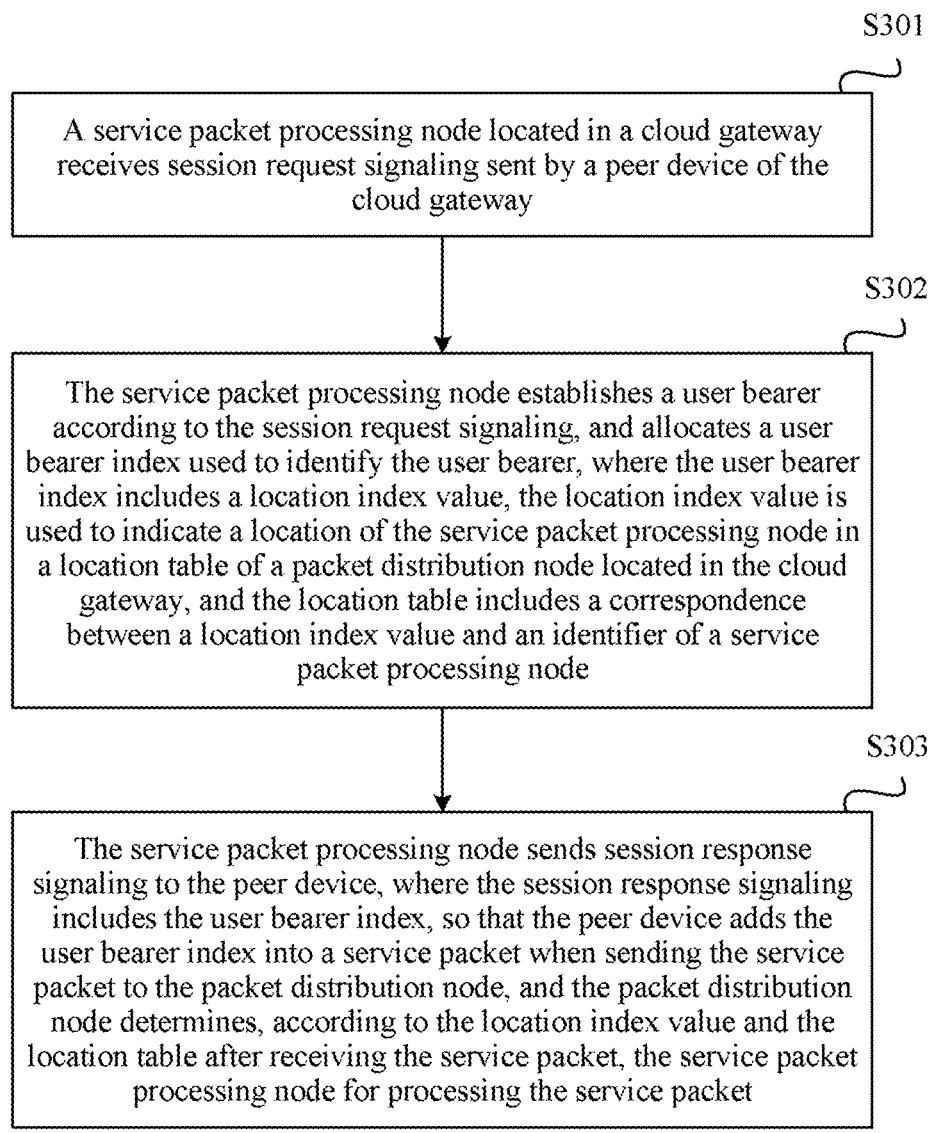
FIG. 3 is a schematic flowchart of a service packet distribution method according to an embodiment of the present disclosure.

The following uses FIG. 3 as an example to describe in detail a service packet distribution method provided in an embodiment of the present disclosure. FIG. 3 is a schematic flowchart of the service packet distribution method according to this embodiment of the present disclosure. The service packet distribution method may be implemented by using a service packet processing node located in a cloud gateway.

As shown in FIG. 3, the service packet distribution method includes the following steps:

Step S301: The service packet processing node located in the cloud gateway receives session request signaling sent by a peer device of the cloud gateway.

Specifically, the service packet processing node is powered on and operates. When the service packet processing node is in an operating state, the service packet processing node receives the session request signaling sent by the peer device.

Step S302: The service packet processing node establishes a user bearer according to the session request signaling, and allocates a user bearer index used to identify the user bearer, where the user bearer index includes a location index value, the location index value is used to indicate a location of the service packet processing node in a location table of a packet distribution node located in the cloud gateway, and the location table includes a correspondence between a location index value and an identifier of a service packet processing node.

Specifically, each service packet processing node has multiple location index values, and the location index values of each service packet processing node are different. For example, service packet processing node 1 has 5 location index values, and the 5 location index values are 11, 12, 13, 14, and 15 respectively. Service packet processing node 2 has 3 location index values, and the 3 location index values are 21, 22, and 23 respectively, by analogy. In this embodiment of the present disclosure, using different location index values of each service packet processing node is ensured in an example. The service packet processing node establishes a user bearer after receiving the session request sent by the peer device, and selects a location index value from the multiple index values corresponding to the service packet processing node to allocate to the established user bearer.

It may be understood that, location index values of each service packet processing node are different, so that each service packet processing node can allocate a different location index value to an established user bearer, and further ensures that when service packets are received, the service packets can be distributed to multiple service packet processing nodes for processing. As a result, a quantity of service packets processed on each service packet processing node is balanced, and the service packets can be processed in time, which improves processing efficiency of the service packet processing node.

Further, the service packet processing node randomly selects one location index value from the multiple location index values of the service packet processing node to allocate to the established user bearer, that is, the service packet processing node classifies, according to its own location index values, established user bearers into multiple subsets, and each subset has a same location index value. When the service packet processing node is faulty, a failover can be performed. The service packet processing node backs up the location index values of the service packet processing node and an identifier of the service packet processing node to another service packet processing node in a unit of each subset, and migrates a user bearer context on the faulty service packet processing node to another service packet processing node, so as to ensure timely service packet processing.

For example, service packet processing node 1 has 5 location index values, that is, service packet processing node 1 may be divided into 5 subsets, and a location index value of subset 1 is 11, a location index value of subset 2 is 12, and the like. When service packet processing node 1 is faulty, a failover can be performed. Service packet processing 1 backs up the location index values of service packet processing node 1 and an identifier of service packet processing node 1 to another 5 service packet processing nodes in a unit of each subset, and service packet processing node 1 migrates its own user bearer context to another service packet processing node, so as to ensure timely service packet processing. When service packets are received, service packets that are originally to be processed by service packet processing node 1 are distributed to the another 5 service packet processing nodes for processing, so that a quantity of service packets processed on each service packet processing node is balanced, and the service packets can be processed in time, which improves processing efficiency of the service packet processing node.

It should be noted that, the location index value is used to indicate a location of each service packet processing node in the location table of the packet distribution node, and is used by the packet distribution node to determine, according to the location index value and the location table when the peer device exchanges a service packet with the packet distribution node, the service packet processing node for processing the service packet. The location table includes a correspondence between a location index value and an identifier of a service packet processing node.

In an example, service packet processing node 1 sends correspondences between the 5 location index values of service packet processing node 1 and an identifier of service packet processing node 1 to the packet distribution node; service packet processing node 2 sends correspondences between the 3 location index values of service packet processing node 2 and an identifier of service packet processing node 2 to the packet distribution node. The packet distribution node receives the correspondences that are sent by service packet processing 1 and service packet processing 2 and are between their own location index values and the identifiers of the service packet processing nodes. In this way, the packet distribution node establishes the location table according to a combination of the received correspondences between the location index values and the identifiers of the service packet processing nodes, and the packet distribution node distributes a service packet according to the established location table when receiving the service packet sent by the peer device.

Step S303: The service packet processing node sends session response signaling to the peer device, where the session response signaling includes the user bearer index, so that the peer device adds the user bearer index into a service packet when sending the service packet to the packet distribution node, and the packet distribution node determines, according to the location index value and the location table after receiving the service packet, the service packet processing node for processing the service packet.

Specifically, the user bearer index may be specifically a TEID or a GRE key. A length of the user bearer index may be 32 bits. After allocating the location index value to the established user bearer, the service packet processing node uses some bits (for example, 10 bits) in the 32 bits to save the allocated location index value. The service packet processing node sends the user bearer index that stores the location index value to the peer device by including the user bearer index into the session response signaling.

After receiving the session response signaling, the peer device obtains the user index bearer from the session response signaling, and includes the user bearer index into a service packet to send to the packet distribution node.

After receiving the service packet, the packet distribution node obtains the location index value from the user bearer index carried in the service packet, and determines, according to the location index value and the location table, the service packet processing node for processing the service packet.

The location table includes a correspondence between a location index value and an identifier of a service packet processing node. The identifier of the service packet processing node may be specifically an ID of the service packet processing node.

Each service packet processing node separately sends a correspondence between a location index value allocated by the service packet processing node and an identifier of the service packet processing node to the packet distribution node. After receiving the correspondence that is sent by each service packet processing node and is between the location index value and the identifier of the service packet processing node, the packet distribution node establishes the location table according to a combination of the correspondences between the multiple location index values and the identifier of the service packet processing node.

It should be noted that, at least one packet distribution node and at least two service packet processing nodes exist in the cloud gateway. Therefore, before each service packet processing node sends the location index value and the correspondence, an administrator performs configuration on the at least two service packet processing nodes, so that each packet distribution node receives location index values and correspondences sent by several designated service packet processing nodes, and further establishes the location table. Configuration is performed on the at least two service packet processing nodes, so that the packet distribution node sends a service packet to a fixed service packet processing node, which improves distribution efficiency of the packet distribution node.

Correspondingly, after receiving the service packet, the packet distribution node determines the service packet processing node corresponding to the location index value according to the location index value and by using the correspondence between the location index value and the identifier of the service packet processing node in the location table, and further determines the service packet processing node for processing the service packet that carries the location index value.

Optionally, after the packet distribution node determines the service packet processing node, the method may further include: receiving, by the service packet processing node, the service packet sent by the packet distribution node for processing. In this way, the packet distribution node can implement flexible distribution on the service packet, and the service packet processing node can perform service processing on the service packet quickly.

Optionally, the cloud gateway further includes a management node. The management node is another subsystem of the cloud gateway, and primarily detects an operating state of each service packet processing node, and determines, according to the operating state (for example, overloaded, faulty, or normal) of the service packet processing node, whether to migrate a user bearer context on the service packet processing node.

For example, when a service packet processing node is faulty and a failover can be performed, it is determined that a user bearer context on the faulty service packet processing node is to be migrated to another service packet processing node, so as to ensure timely service packet processing. Alternatively, when all service packet processing nodes in the cloud gateway are occupied but are not in a saturated state, and when all the service packet processing nodes in the cloud gateway are in operating states, total power consumption of the cloud gateway is relatively high. In this case, it may be determined that user bearer contexts can be migrated to a same service packet processing node, so that the other service packet processing node(s) have low power consumption, thereby reducing the total power consumption of the cloud gateway.

Correspondingly, when a service packet processing node in the other service packet processing node(s) in the cloud gateway is to be migrated out of the cloud gateway, the method may further include:

receiving, by the service packet processing node, a migration message sent by a management node in the cloud gateway, where the migration message includes an identifier of the to-be-migrated-out service packet processing node;

determining, by the service packet processing node, a location index value corresponding to the identifier of the to-be-migrated-out service packet processing node according to the identifier of the to-be-migrated-out service packet processing node and correspondences respectively between location index values of the other service packet processing node(s) and identifiers of the other service packet processing node(s); and sending, by the service packet processing node, a correspondence between the location index value corresponding to the identifier of the to-be-migrated-out service packet processing node and the identifier of the service packet processing nodes to the packet distribution node, so that the packet distribution node updates a correspondence related to the location index value corresponding to the identifier of the to-be-migrated-out service packet processing node in the location table.

In the following, that the service packet processing node is service packet processing node 1 is used as an example for description.

Specifically, when a service packet processing node (for example, service packet processing node 2) in the other service packet processing node(s) (for example, service packet processing node 2 and service packet processing node 3) in the cloud gateway is to be migrated out of the cloud gateway, service packet processing node 1 receives a migration message sent by the management node, where the migration message includes: an identifier of the to-be-migrated-out service packet processing node (that is, an identifier of service packet processing node 2).

Service packet processing 1 determines a location index value corresponding to the identifier of the to-be-migrated-out service packet processing node (that is, the identifier of service packet processing node 2) according to the identifier of the to-be-migrated-out service packet processing node and correspondences respectively between location index values of the other service packet processing nodes and identifiers of the other service packet processing node(s); service packet processing node 1 sends a correspondence between the location index value corresponding to the identifier of the to-be-migrated-out service packet processing node and the identifier of the service packet processing node to the packet distribution node, so that the packet distribution node updates a correspondence related to the location index value corresponding to the identifier of the to-be-migrated-out service packet processing node in the location table.

Further, before service packet processing node 1 receives the migration message, service packet processing node 1 further receives correspondences that are sent by the other service packet processing node(s) and are between the location index values of the other service packet processing node(s) and the identifier of the service packet processing node, and stores the location index values and the correspondences.

For example, service packet processing node 2 has 3 location index values, that is, service packet processing node 3 may back up the 3 location index values to another 3 service packet processing nodes respectively. For example, service packet processing node 2 backs up the 3 location index values to service packet processing node 1, service packet processing node 3, and service packet processing 4 respectively. In this case, service packet processing node 1 receives a correspondence that is sent by service packet processing 2 and is between a location index value and an identifier of service packet processing node 2, and stores the location index value and the correspondence. Similarly, service packet processing node 3 and service packet processing node 4 receive and store location index values and correspondences.

Therefore, when receiving the migration message, the service packet processing node may determine the location index value corresponding to the identifier of the to-be-migrated-out service packet processing node according to the identifier of the to-be-migrated-out service packet processing node and the correspondences between the location index values of the other service packet processing node(s) and the identifier of the service packet processing node.

According to the service packet distribution method provided in this embodiment of the present disclosure, a service packet processing node allocates a location index value to an established user bearer, and notifies a peer device of the location index value, so that the peer device includes the location index value into a service packet when sending the service packet to a packet distribution node, and the packet distribution node determines, according to the location index value and a location table, the service packet processing node for processing the service packet. The prior art has the following problem: When performing distribution processing on a service packet, a cloud gateway selects a service packet processing node according to only an IP address carried in the service packet, which is inflexible and easily causes a situation in which the selected service packet processing node cannot perform processing on the service packet, thereby leading to service packet distribution failures of the cloud gateway and reducing a distribution success rate. In the foregoing solutions, the location index value is allocated by the service packet processing node, which resolves the problem in the prior art, implements flexible service packet distribution of the cloud gateway, and improves a service packet distribution success rate of the cloud gateway.

Figure 4:
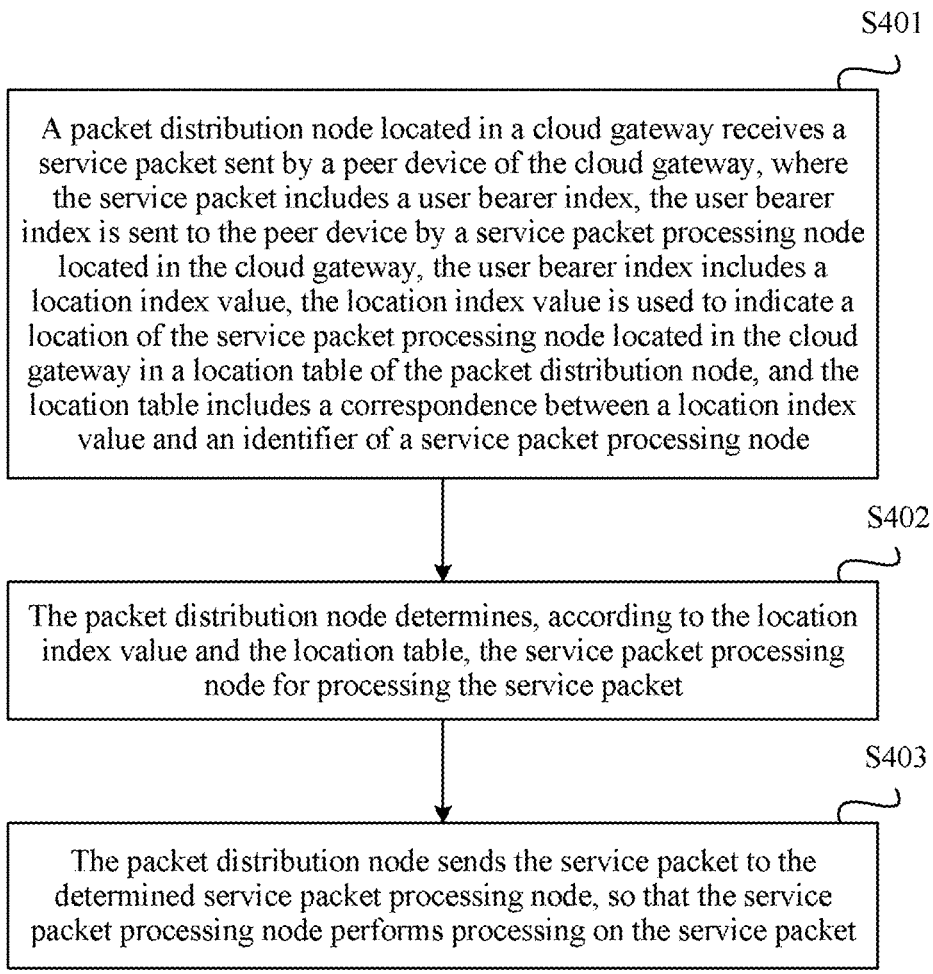
FIG. 4 is a schematic flowchart of another service packet distribution method according to an embodiment of the present disclosure.

The following uses FIG. 4 as an example to describe in detail another service packet distribution method provided in an embodiment of the present disclosure. FIG. 4 is a schematic flowchart of the another service packet distribution method according to this embodiment of the present disclosure. The service packet distribution method may be implemented by using a packet distribution node in a cloud gateway.

As shown in FIG. 4, the service packet distribution method includes the following steps:

Step S401: The packet distribution node located in the cloud gateway receives a service packet sent by a peer device of the cloud gateway, where the service packet includes a user bearer index, the user bearer index is sent to the peer device by a service packet processing node located in the cloud gateway, the user bearer index includes a location index value, the location index value is used to indicate a location of the service packet processing node in a location table of the packet distribution node located in the cloud gateway, and the location table includes a correspondence between a location index value and an identifier of a service packet processing node.

Specifically, the peer device sends the service packet to the packet distribution node, where the service packet includes the user bearer index, the user bearer index is sent to the peer device by the service packet processing node located in the cloud gateway, the user bearer index includes the location index value, the location index value is used to indicate the location of the service packet processing node in the location table of the packet distribution node, and the location table includes the correspondence between a location index value and an identifier of a service packet processing node.

A specific process of allocating the location index value by the service packet processing node and a specific function of the location index value have been described in detail in the foregoing embodiment, and details are not described herein.

Further, the user bearer index may be specifically a TEID or a GRE key. A length of the user bearer index may be 32 bits. After allocating the location index value to the established user bearer, the service packet processing node uses some bits (for example, 10 bits) in the 32 bits to save the allocated location index value. The service packet processing node sends the user bearer index that stores the location index value to the peer device by including the user bearer index into the session response signaling.

After receiving the session response signaling, the peer device obtains the user bearer index from the session response signaling, and includes the user bearer index into a service packet to send to the packet distribution node.

Step S402: The packet distribution node determines, according to the location index value and the location table, the service packet processing node for processing the service packet.

Specifically, after receiving the service packet, the packet distribution node obtains the location index value from the user bearer index carried in the service packet, and determines, according to the location index value and the correspondence between a location index value and an identifier of a service packet processing node in the location table, the service packet processing node for processing the service packet.

Further, the location table is established by the packet distribution node according to a correspondence that is sent by the service packet processing node and is between the location index value allocated by the service packet processing node and an identifier of the service packet processing node.

Step S403: The packet distribution node sends the service packet to the determined service packet processing node, so that the service packet processing node performs processing on the service packet.

Specifically, after determining the service packet processing node, the packet distribution node forwards the service packet sent by the peer device to the determined service packet processing node, and the service packet processing node performs processing on the service packet.

Optionally, before step S401 in this embodiment of the present disclosure, the service packet distribution method further includes a step in which the packet distribution node receives the correspondence that is sent by the service packet distribution node and is between the location index value allocated by the service packet processing node and the identifier of the service packet processing node. This step may enable the packet distribution node to establish the location table according to received related information, and when receiving the service packet, quickly determine, according to the established location table, the service packet processing node for processing the service packet, which improves distribution efficiency of the packet distribution node.

Specifically, each service packet processing node sends a correspondence between a location index value allocated by the service packet processing node and an identifier of the service packet processing node to the packet distribution node. After receiving related information sent by each service packet processing node, the packet distribution node combines multiple pieces of the related information to establish the location table.

It should be noted that, at least one packet distribution node and at least two service packet processing nodes exist in the cloud gateway. Therefore, before each service packet processing node sends the related information, an administrator performs configuration on the at least two service packet processing nodes, so that each packet distribution node receives related information sent by several designated service packet processing nodes.

Optionally, this embodiment of the present disclosure further includes a step in which when a service packet processing node in the other service packet processing node(s) in the cloud gateway is to be migrated out of the cloud gateway, the packet distribution node receives a correspondence that is sent by the service packet processing node and is between a location index value corresponding to an identifier of the to-be-migrated-out service packet processing node and an identifier of the service packet processing node, and updates the location table. This step may enable the packet distribution node to update the location table in real time, which avoids sending a service packet to a faulty service packet processing node, and improves distribution efficiency. The specific step is specifically as follows:

receiving, by the packet distribution node, the correspondence that is sent by the service packet processing node and is between the location index value corresponding to the identifier of the to-be-migrated-out service packet processing node and the identifier of the service packet processing node; and updating, by the packet distribution node based on the correspondence between the location index value corresponding to the identifier of the to-be-migrated-out service packet processing node and the identifier of the service packet processing node, a correspondence related to the location index value corresponding to the to-be-migrated-out service packet processing node in the location table.

Specifically, the packet distribution node receives the correspondence that is sent by the service packet processing node and is between the location index value corresponding to the identifier of the to-be-migrated-out service packet processing node and the identifier of the service packet processing node.

Further, in this embodiment of the present disclosure, the service packet processing node is specifically a to-be-migrated-in service packet processing node, the to-be-migrated-in service packet processing node first receives a migration message sent by a management node, where the migration message includes an identifier of the to-be-migrated-out service packet processing node. The to-be-migrated-in service packet processing node determines the location index value corresponding to the identifier of the to-be-migrated-out service packet processing node according to the identifier of the to-be-migrated-out service packet processing node, and sends the correspondence between the location index value corresponding to the identifier of the to-be-migrated-out service packet processing node and the identifier of the service packet processing node to the packet distribution node.

After receiving the correspondence between the location index value corresponding to the identifier of the to-be-migrated-out service packet processing node and the identifier of the service packet processing node, the packet distribution node updates, based on the correspondence between the location index value corresponding to the identifier of the to-be-migrated-out service packet processing node and the identifier of the service packet processing node, a correspondence related to the location index value corresponding to the to-be-migrated-out service packet processing node in the location table.

According to the service packet distribution method provided in this embodiment of the present disclosure, a packet distribution node determines, according to a location index value and a location table, a service packet processing node for processing a service packet. The prior art has the following problem: When performing distribution processing on a service packet, a cloud gateway selects a service packet processing node according to only an IP address carried in the service packet, which is inflexible and easily causes a situation in which the selected service packet processing node cannot perform processing on the service packet, thereby leading to service packet distribution failures of the cloud gateway and reducing a distribution success rate. In the foregoing solutions, the location index value is allocated by the service packet processing node, which resolves the problem in the prior art, implements flexible service packet distribution of the cloud gateway, and improves a service packet distribution success rate of the cloud gateway.

Figure 5:
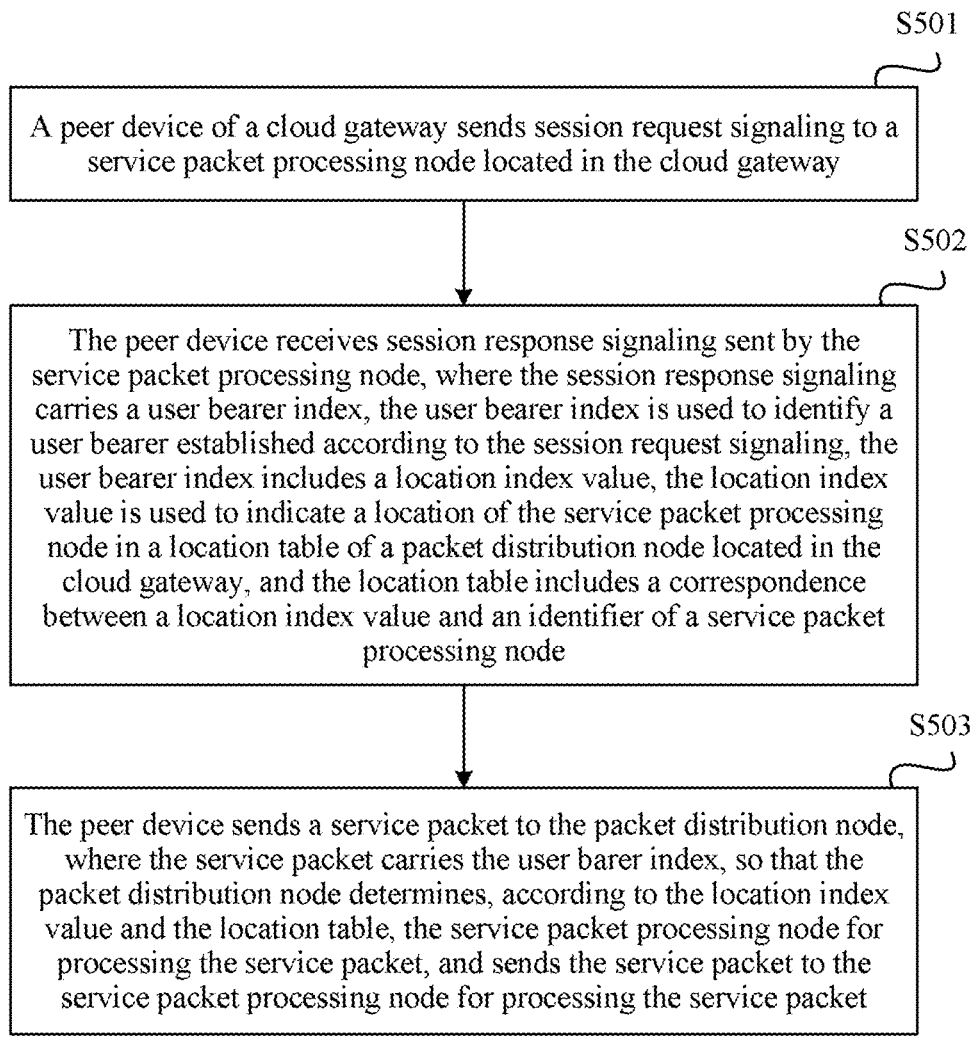
FIG. 5 is a schematic flowchart of still another service packet distribution method according to an embodiment of the present disclosure.

The following uses FIG. 5 as an example to describe in detail still another service packet distribution method provided in an embodiment of the present disclosure. FIG. 5 is a schematic flowchart of the still another service packet distribution method according to this embodiment of the present disclosure. The service packet distribution method may be implemented by using a peer device that is directly connected to a cloud gateway physically or logically.

As shown in FIG. 5, the service packet distribution method includes the following steps:

Step S501: The peer device of the cloud gateway sends session request signaling to a service packet processing node located in the cloud gateway.

Step S502: The peer device receives session response signaling sent by the service packet processing node, where the session response signaling carries a user bearer index, the user bearer index is used to identify a user bearer established according to the session request signaling, the user bearer index includes a location index value, the location index value is used to indicate a location of the service packet processing node in a location table of a packet distribution node located in the cloud gateway, and the location table includes a correspondence between a location index value and an identifier of a service packet processing node.

Specifically, the user bearer index may be specifically a TEID or a GRE key. A length of the user bearer index may be 32 bits. After allocating the location index value to the established user bearer, the service packet processing node uses some bits (for example, 10 bits) in the 32 bits to save the allocated location index value. The service packet processing node sends the user bearer index that stores the location index value to the peer device by including the user bearer index into the session response signaling.

A specific process of allocating the location index value by the service packet processing node and a specific function of the location index value have been described in detail in the foregoing embodiment, and details are not described herein.

Step S503: The peer device sends a service packet to the packet distribution node, where the service packet carries the user bearer index, so that the packet distribution node determines, according to the location index value and the location table, the service packet processing node for processing the service packet, and sends the service packet to the service packet processing node for processing the service packet.

Specifically, after receiving the session response signaling, the peer device obtains the user bearer index from the session response signaling, and includes the user bearer index into the service packet to send to the packet distribution node.

After receiving the service packet, the packet distribution node obtains the location index value from the user bearer index carried in the service packet, and determines, according to the location index value and the location table, the service packet processing node for processing the service packet.

The location table is established by the packet distribution node according to a correspondence that is sent by the service packet processing node and is between the location index value allocated by the service packet processing node and an identifier of the service packet processing node. The identifier of the service packet processing node may be specifically an ID of the service packet processing node.

In the foregoing embodiment, a specific process of establishing the location table by the packet distribution node has been described in detail, and details are not described herein.

According to the service packet distribution method provided in this embodiment of the present disclosure, a peer device includes a location index value allocated by a service packet processing node into a service packet when sending the service packet to a packet distribution node, so that the packet distribution node determines, according to the location index value and a location table, the service packet processing node for processing the service packet. The prior art has the following problem: When performing distribution processing on a service packet, a cloud gateway selects a service packet processing node according to only an IP address carried in the service packet, which is inflexible and easily causes a situation in which the selected service packet processing node cannot perform processing on the service packet, thereby leading to service packet distribution failures of the cloud gateway and reducing a distribution success rate. In the foregoing solutions, the location index value is allocated by the service packet processing node, which resolves the problem in the prior art, implements flexible service packet distribution of the cloud gateway, and improves a service packet distribution success rate of the cloud gateway.

Figure 6A:
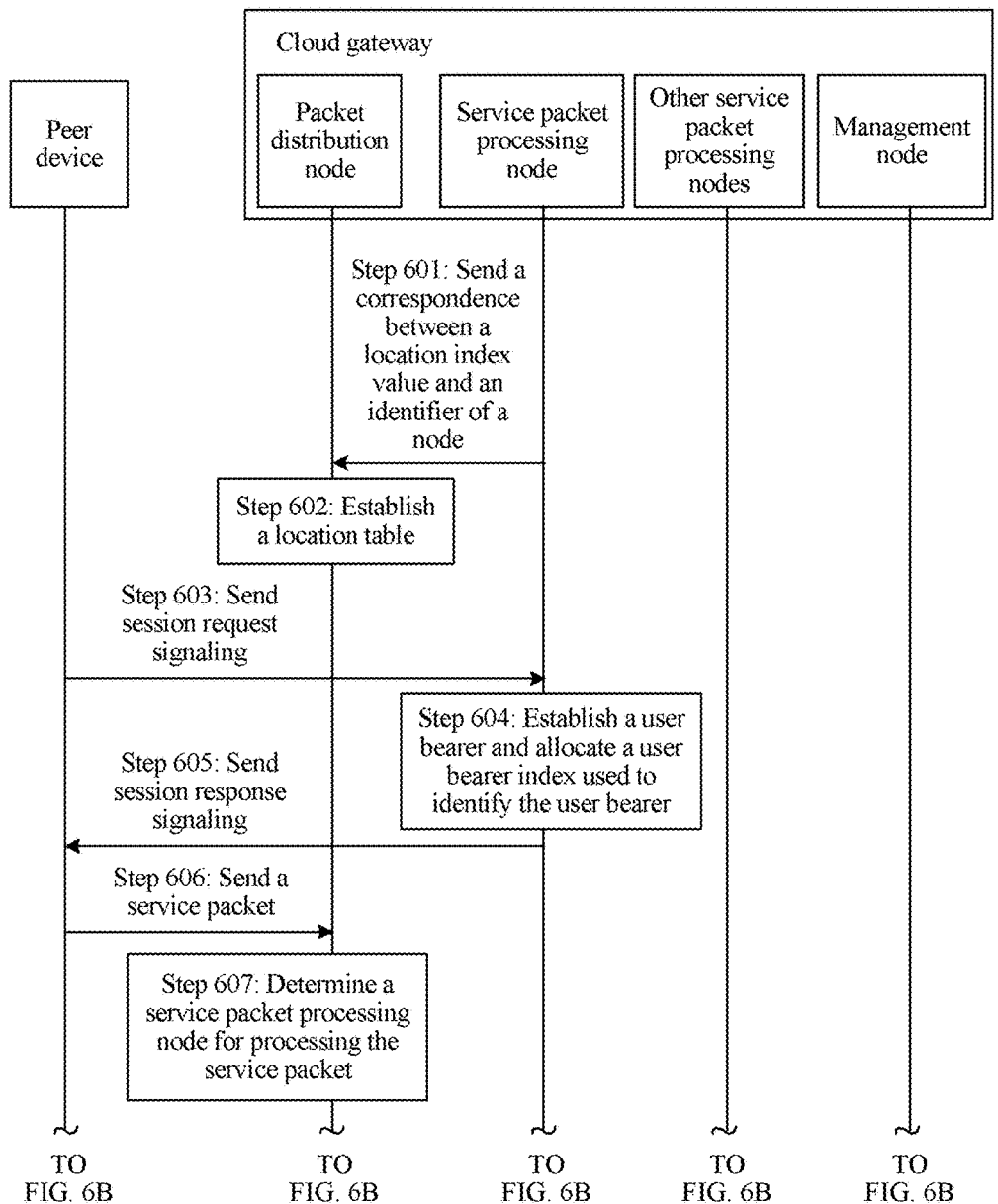
FIG. 6A and FIG. 6B are a signaling diagram of a service packet distribution method according to an embodiment of the present disclosure.
Figure 6B:
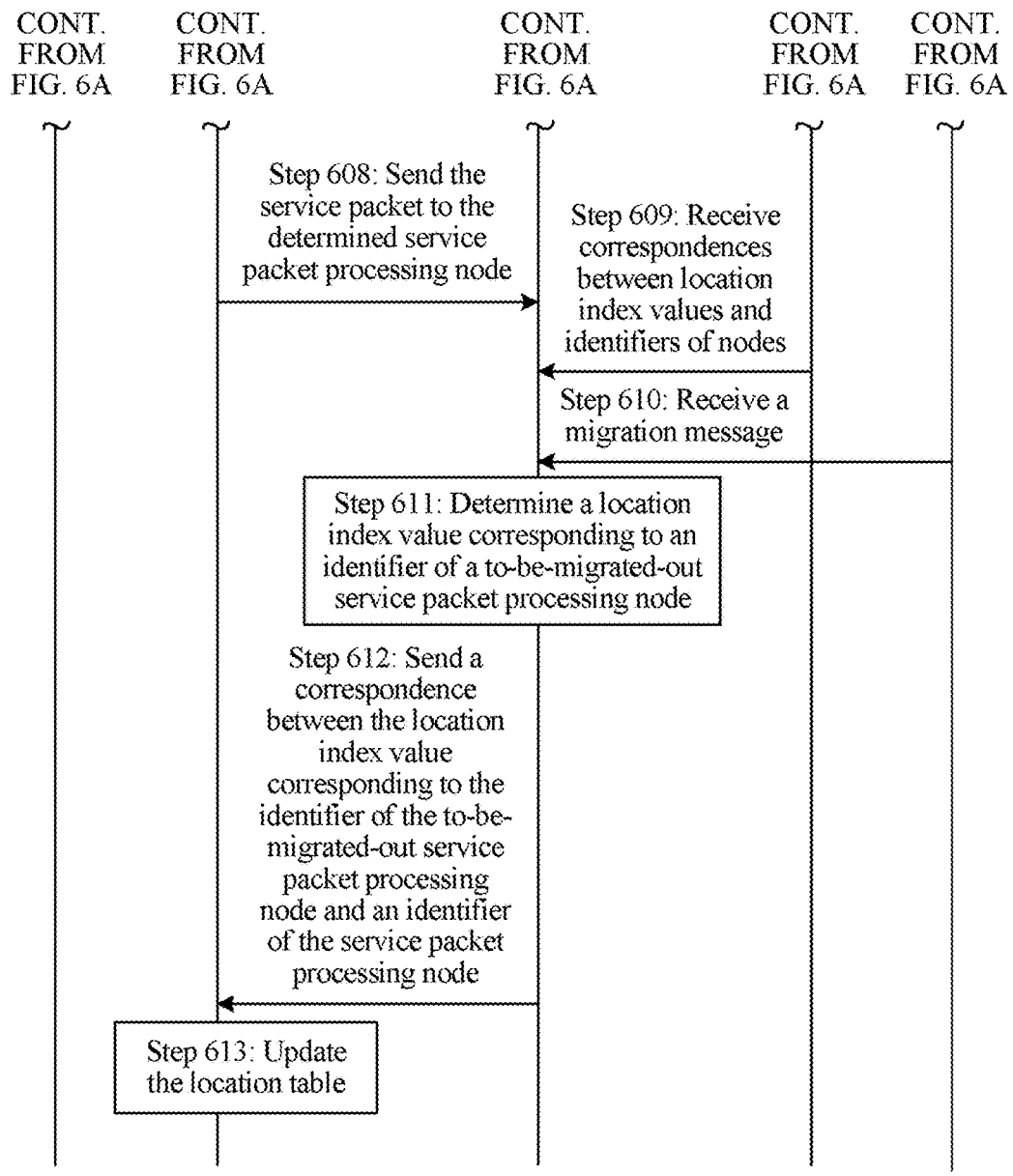

Further, FIG. 6A and FIG. 6B are a signaling diagram of a service packet distribution method according to an embodiment of the present disclosure. The signaling diagram shown in FIG. 6A and FIG. 6B shows in detail an interaction process of a peer device, a packet distribution node, and a service packet processing node. The service packet distribution method in FIG. 6A and FIG. 6B may be executed according to the process described in the foregoing embodiment, and only a simple description is provided herein. Specific steps are as follows.

Step 601: A service packet processing node located in a cloud gateway sends a correspondence between a location index value and an identifier of the service packet processing node to a packet distribution node located in the cloud gateway.

Specifically, each service packet processing node located in the cloud gateway sends a correspondence between a location index value and an identifier of the service packet processing node to the packet distribution node.

Each service packet processing node has multiple location index values, and the location index values in each service packet processing node are different. For example, service packet processing node 1 has 5 location index values, and the 5 location index values are 11, 12, 13, 14, and 15 respectively.

Step 602: The packet distribution node establishes a location table according to the correspondence between the location index value and the identifier of the service packet processing node.

Specifically, after receiving correspondences that are sent by multiple service packet processing nodes and are between location index values and identifiers of the service packet processing nodes, the packet distribution node establishes the location table according to a combination of the correspondences between the location index values and the identifiers of the service packet processing nodes.

It should be noted that, at least one packet distribution node and at least two service packet processing nodes exist in the cloud gateway. Therefore, before each service packet processing node sends the correspondence between the location index value and the identifier of the service packet processing node, an administrator performs configuration on each service packet processing node, so that each packet distribution node receives correspondences that are sent by several designated service packet processing nodes and are between location index values and identifiers of the service packet processing nodes, and further establishes the location table. Configuration is performed on each service packet processing node, so that the packet distribution node sends a service packet to a fixed service packet processing node, which improves distribution efficiency of the packet distribution node.

Step 603: A peer device of the cloud gateway sends session request signaling to the service packet processing node.

Step 604: The service packet processing node establishes a user bearer according to the session request signaling, and allocates a user bearer index used to identify the user bearer, where the user bearer index includes a location index value, the location index value is used to indicate a location of the service packet processing node in the location table of the packet distribution node, and the location table includes a correspondence between the location index value and the identifier of the service packet processing node.

Specifically, after receiving the session request sent by the peer device, the service packet processing node establishes the user bearer, and allocates the user bearer index used to identify the user bearer, where the user bearer index includes the location index value.

Further, after receiving the session request sent by the peer device, the service packet processing node establishes the user bearer, randomly selects one location index value from multiple location index values corresponding to the service packet processing node to allocate to the established user bearer, and includes the allocated location index value into the user bearer index.

In the foregoing embodiment, a specific process of allocating the location index value to the established user bear by the service packet processing node has been described in detail, and details are not described herein.

Step 605: The service packet processing node sends session response signaling to the peer device, where the session response signaling includes the user bearer index.

Specifically, the service packet processing node includes the allocated location index value into the user bearer index, further includes the user bearer index into the session response signaling, and sends the session response signaling to the peer device.

Step 606: The peer device sends a service packet to the packet distribution node, where the service packet carries the user bearer index.

Specifically, after receiving the session response signaling, the peer device obtains the user bearer index from the session response signaling, includes the user bearer index into the service packet, and sends the service packet to the packet distribution node.

Step 607: The packet distribution node determines, according to the location index value and the location table, the service packet processing node for processing the service packet.

Specifically, after receiving the service packet, the packet distribution node obtains the location index value from the user bearer index carried in the service packet, and determines, according to the location index value and the correspondence between the location index value and the identifier of the service packet processing node in the location table, the service packet processing node for processing the service packet.

Step 608: The packet distribution node sends the service packet to the determined service packet processing node, so that the service packet processing node performs processing on the service packet.

Optionally, when a service packet processing node in the other service packet processing node(s) in the cloud gateway is to be migrated out of the cloud gateway, the method may further include the following steps:

For differentiating the multiple service packet processing nodes in the cloud gateway, in the following steps, that the service packet processing node is service packet processing node 1 is used as an example for description.

Step 609: The service packet processing node receives correspondences that are sent by the other service packet processing node(s) located in the cloud gateway and are between location index values of the other service packet processing node(s) and identifiers of the other service packet processing nodes.

Specifically, service packet processing node 1 receives the correspondences that are sent by the other service packet processing node(s) (for example, service packet processing node 2 and service packet processing node 3) and are between the location index values of the other service packet processing node(s) and the identifier of the service packet processing node, and service packet processing node 1 stores the location index values and the correspondences.

Step 610: The service packet processing node receives a migration message sent by a management node in the cloud gateway, where the migration message includes an identifier of the to-be-migrated-out service packet processing node.

Specifically, when a service packet processing node (for example, service packet processing node 2) in the other service packet processing node(s) (for example, service packet processing node 2 and service packet processing node 3) in the cloud gateway is to be migrated out of the cloud gateway, service packet processing node 1 receives the migration message sent by the management node, where the migration message includes the identifier of the to-be-migrated-out service packet processing node (that is, service packet processing node 2).

Step 611: The service packet processing node determines, according to the identifier of the to-be-migrated-out service packet processing node and the correspondences between the location index values of the other service packet processing node(s) and the identifier of the service packet processing node, a location index value corresponding to the identifier of the to-be-migrated-out service packet processing node.

Specifically, service packet processing node 1 determines the location index value corresponding to the identifier of the to-be-migrated-out service packet processing node (that is, the identifier of service packet processing node 2) according to the identifier of the to-be-migrated-out service packet processing node (that is, the identifier of service packet processing node 2) and the correspondences between the location index values of the other service packet processing node(s) and the identifier of the service packet processing node.

Step 612: The service packet processing node sends a correspondence between the location index value corresponding to the identifier of the to-be-migrated-out serviced packet processing node and an identifier of the service packet processing node to the packet distribution node.

Step 613: The packet distribution node updates, based on the correspondence between the location index value corresponding to the identifier of the to-be-migrated-out service packet processing node and the identifier of the service packet processing node, a correspondence related to the location index value corresponding to the to-be-migrated-out service packet processing node in the location table.

Specifically, after receiving the correspondence between the location index value corresponding to the identifier of the to-be-migrated-out service packet processing node and the identifier of the service packet processing node, the packet distribution node updates, based on the correspondence between the location index value corresponding to the identifier of the to-be-migrated-out service packet processing node and the identifier of the service packet processing node, the correspondence related to the location index value corresponding to the to-be-migrated-out service packet processing node in the location table.

In the following, that the peer device is an eNodeB and an MME is used as an example to describe in detail the service packet distribution method provided in this embodiment of the present disclosure.

Figure 7A:
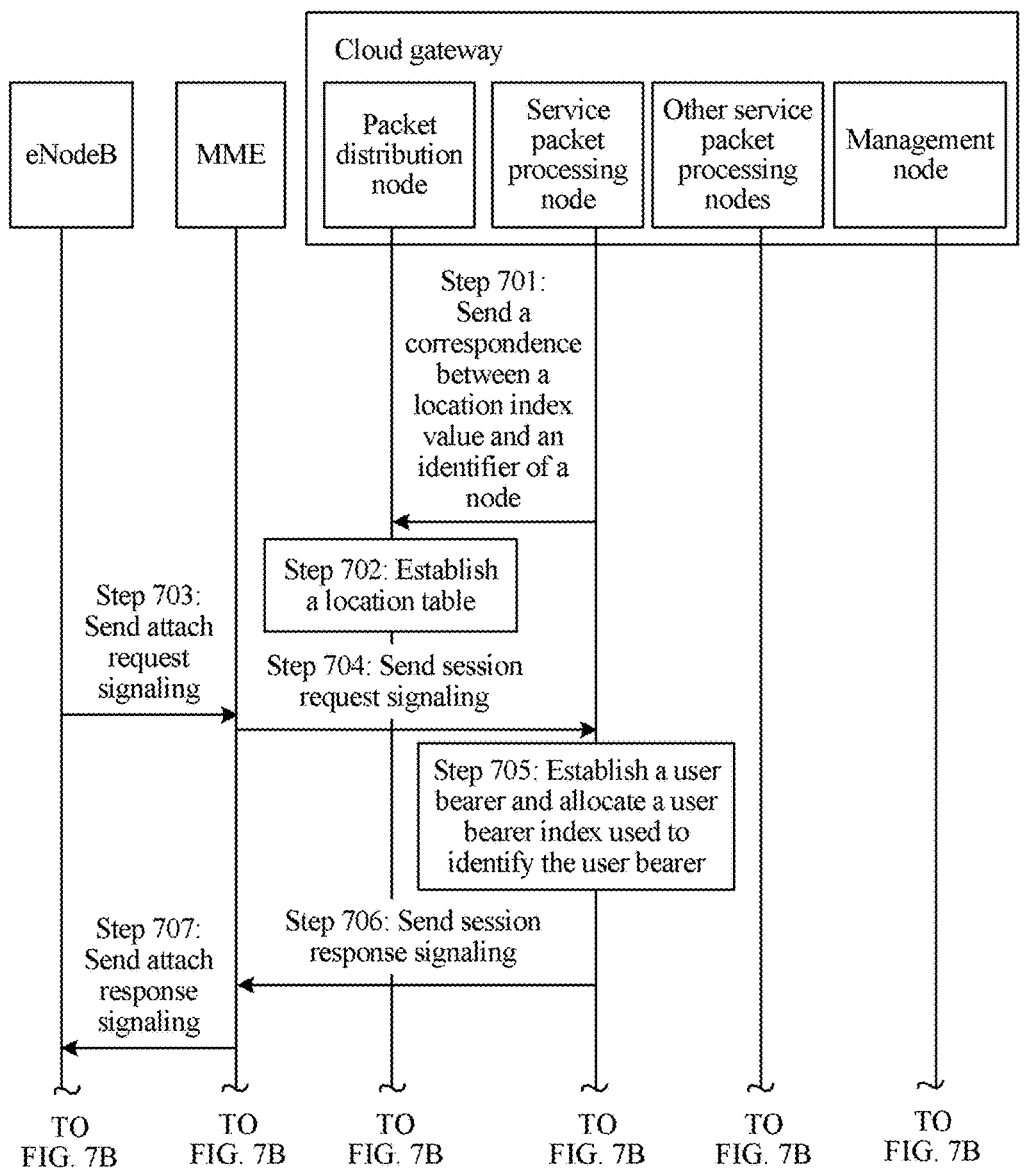
FIG. 7A and FIG. 7B are a signaling diagram of another service packet distribution method according to an embodiment of the present disclosure.
Figure 7B:
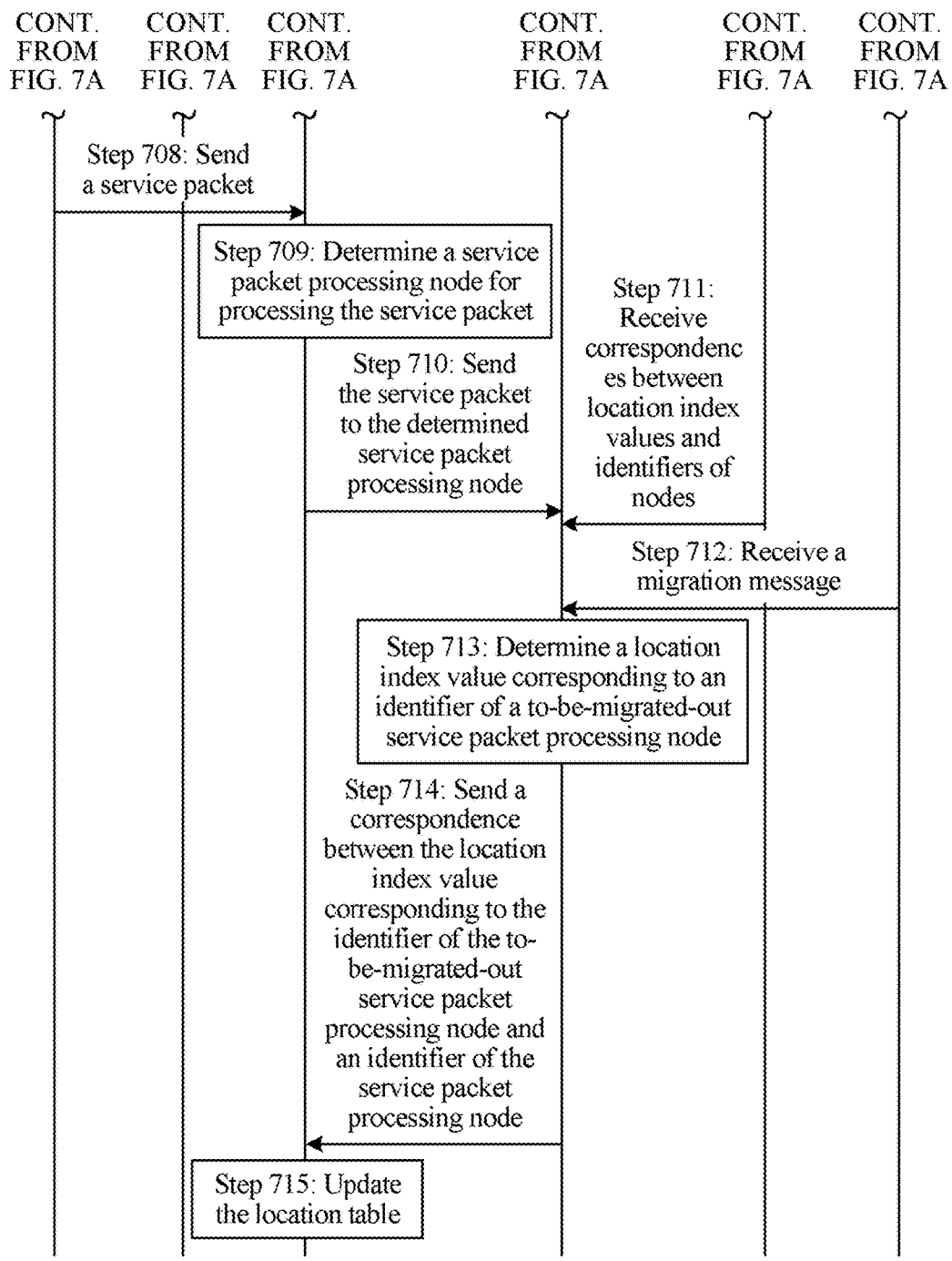

Further, FIG. 7A and FIG. 7B are a signaling diagram of another service packet distribution method according to an embodiment of the present disclosure. The signaling diagram shown in FIG. 7A and FIG. 7B shows an interaction process of an eNodeB, an MME, a packet distribution node, and a service packet processing node. The service packet distribution method in FIG. 7A and FIG. 7B may be executed according to the process described in the foregoing embodiments, and only a simple description is provided herein. Specific steps are as follows.

Step 701: A service packet processing node located in a cloud gateway sends a correspondence between a location index value and an identifier of the service packet processing node to a packet distribution node located in the cloud gateway.

Specifically, each service packet processing node located in the cloud gateway sends a correspondence between a location index value and an identifier of the service packet processing node to the packet distribution node.

In the foregoing embodiment, a specific process of sending the correspondence between a location index value and an identifier of the service packet processing node by the service packet processing node to the packet distribution node has been described in detail, and details are not described herein.

Step 702: The packet distribution node establishes a location table according to the correspondence between the location index value and the identifier of the service packet processing node.

Specifically, in the foregoing embodiment, a specific process of establishing the location table by the packet distribution node has been described in detail, and details are not described herein.

Step 703: An eNodeB sends attach request signaling to an MME.

Step 704: The MME sends session request signaling to the service packet processing node according to the attach request signaling.

Step 705: The service packet processing node establishes a user bearer according to the session request signaling and allocates a user bearer index used to identify the user bearer, where the user bearer index includes a location index value, the location index value is used to indicate a location of the service packet processing node in the location table of the packet distribution node, and the location table includes the correspondence between the location index value and the identifier of the service packet processing node.

Specifically, in the foregoing embodiment, a specific process of allocating the location index value to the established user bearer by the service packet processing node has been described in detail, and details are not described herein.

Step 706: The service packet processing node sends session response signaling to the MME, where the session response signaling carries the user bearer index.

Specifically, the service packet processing node includes the allocated location index value into the user bearer index, further includes the user bearer index in the session response signaling, and sends the session response signaling to the MME.

Step 707: The MME sends attach response signaling to the eNodeB.

Specifically, the MME sends the attach response signaling to the eNodeB, where the attach response signaling includes the user bearer index, and the user bearer index includes the location index value.

Step 708: The eNodeB sends a service packet to the packet distribution node, where the service packet carries the user bearer index.

Specifically, after receiving the attach response signaling, the eNodeB obtains the user bearer index from the attach response signaling, and includes the user bearer index into the service packet to send to the packet distribution node.

Step 709: The packet distribution node determines, according to the location index value and the location table, the service packet processing node for processing the service packet.

Specifically, after receiving the service packet, the packet distribution node obtains the location index value from the user bearer index carried in the service packet, and determines, according to the location index value and the location table, the service packet processing node for processing the service packet.

Step 710: The packet distribution node sends the service packet to the determined service packet processing node, so that the service packet processing node performs processing on the service packet.

Optionally, when a service packet processing node in the other service packet processing node(s) in the cloud gateway is to be migrated out of the cloud gateway, the method may further include the following steps:

For differentiating the multiple service packet processing nodes in the cloud gateway, in the following steps, that the service packet processing node is service packet processing node 1 is used as an example for description.

Step 711: The service packet processing node receives correspondences that are sent by the other service packet processing node(s) located in the cloud gateway and are between location index values of the other service packet processing node(s) and identifiers of the other service packet processing node(s).

Specifically, service packet processing node 1 receives the correspondences that are sent by the other service packet processing node(s) (for example, service packet processing node 2 and service packet processing node 3) and are between the location index values of the other service packet processing node(s) and the identifier of the service packet processing node, and service packet processing node 1 stores the location index values and the correspondences.

Step 712: The service packet processing node receives a migration message sent by a management node in the cloud gateway, where the migration message includes an identifier of the to-be-migrated-out service packet processing node.

Specifically, when a service packet processing node (for example, service packet processing node 2) in the other service packet processing node(s) (for example, service packet processing node 2 and service packet processing node 3) in the cloud gateway is to be migrated out of the cloud gateway, service packet processing node 1 receives the migration message sent by the management node, where the migration message includes the identifier of the to-be-migrated-out service packet processing node (that is, service packet processing node 2).

Step 713: The service packet processing node determines, according to the identifier of the to-be-migrated-out service packet processing node and the correspondences between the location index values of the other service packet processing node(s) and the identifier of the service packet processing node, a location index value corresponding to the identifier of the to-be-migrated-out service packet processing node.

Specifically, service packet processing node 1 determines the location index value corresponding to the identifier of the to-be-migrated-out service packet processing node (that is, the identifier of service packet processing node 2) according to the identifier of the to-be-migrated-out service packet processing node (that is, the identifier of service packet processing node 2) and the correspondences between the location index values of the other service packet processing node(s) and the identifier of the service packet processing node.

Step 714: The service packet processing node sends a correspondence between the location index value corresponding to the identifier of the to-be-migrated-out serviced packet processing node and an identifier of the service packet processing node to the packet distribution node.

Step 715: The packet distribution node updates, based on the correspondence between the location index value corresponding to the identifier of the to-be-migrated-out service packet processing node and the identifier of the service packet processing node, a correspondence related to the location index value corresponding to the to-be-migrated-out service packet processing node in the location table.

Specifically, after receiving the correspondence between the location index value corresponding to the identifier of the to-be-migrated-out service packet processing node and the identifier of the service packet processing node, the packet distribution node updates, based on the correspondence between the location index value corresponding to the identifier of the to-be-migrated-out service packet processing node and the identifier of the service packet processing node, the correspondence related to the location index value corresponding to the to-be-migrated-out service packet processing node in the location table.

In the following, that the peer device is an ePDG is used as an example to describe in detail the service packet distribution method provided in this embodiment of the present disclosure.

Figure 8A:
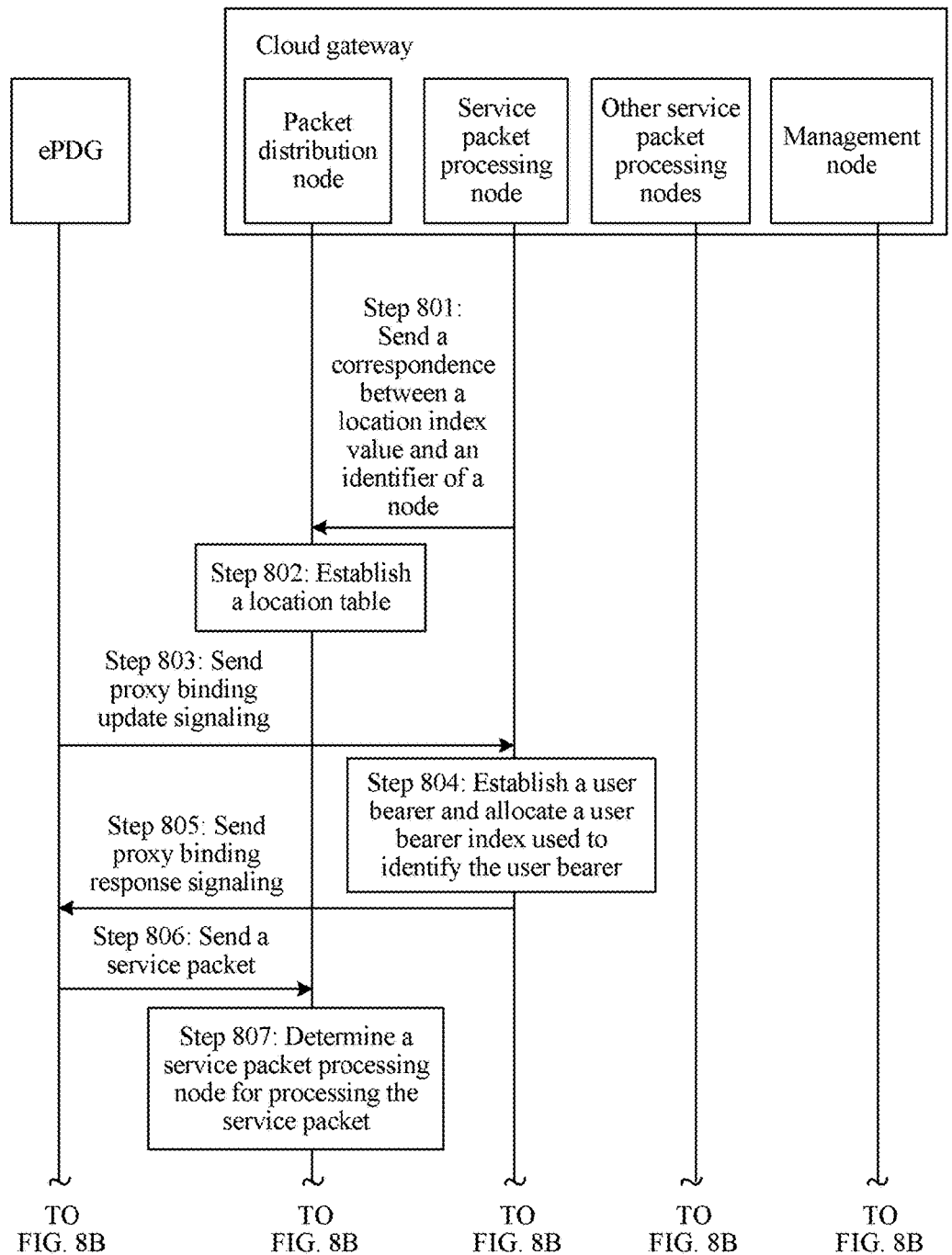
FIG. 8A and FIG. 8B are a signaling diagram of still another service packet distribution method according to an embodiment of the present disclosure.
Figure 8B:
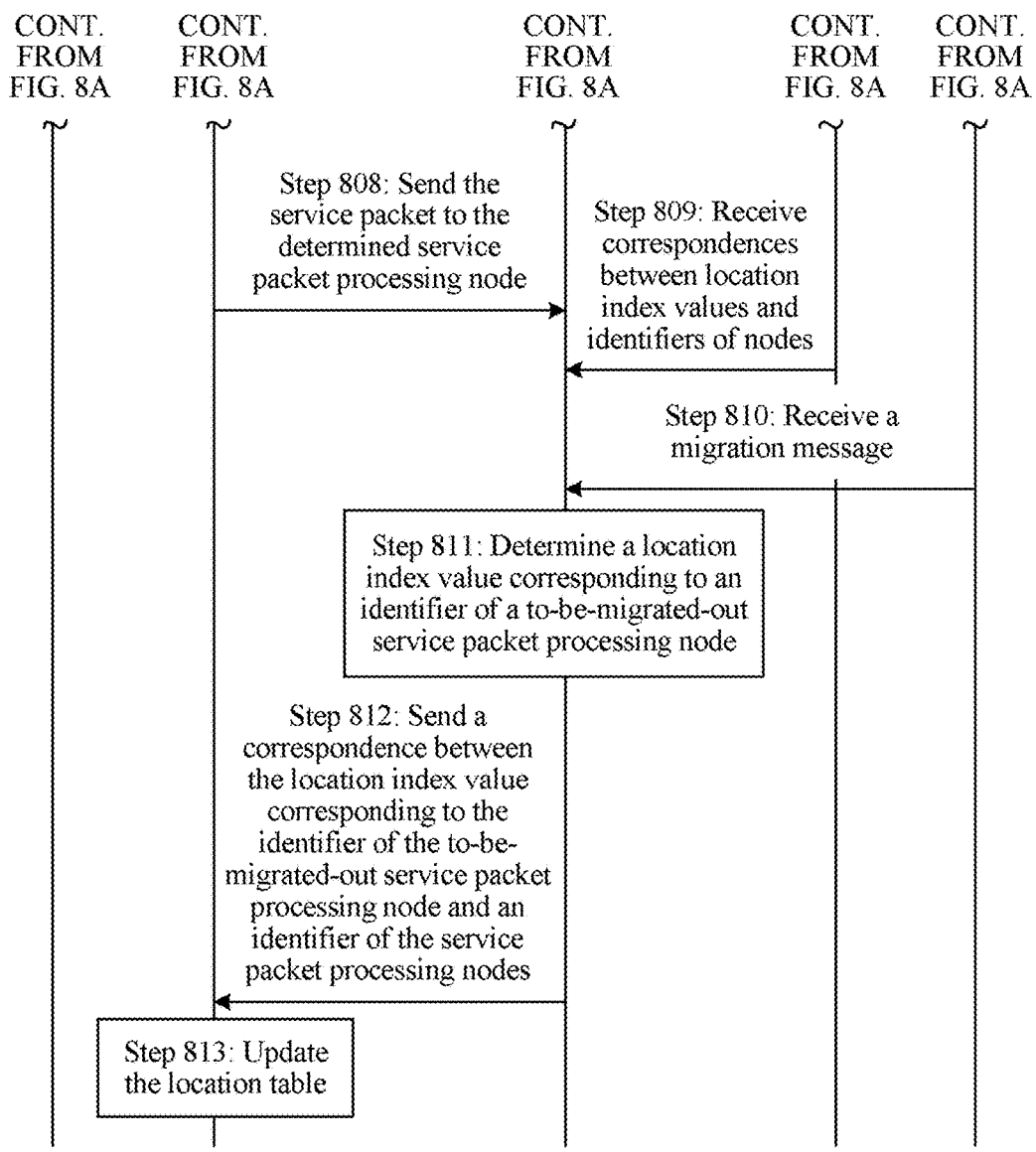

Further, FIG. 8A and FIG. 8B are a signaling diagram of still another service packet distribution method according to an embodiment of the present disclosure. The signaling diagram shown in FIG. 8A and FIG. 8B shows in detail an interaction process of an ePDG, a packet distribution node, and a service packet processing node. The service packet distribution method in FIG. 8A and FIG. 8B may be executed according to the process described in the foregoing embodiment, and only a simple description is provided herein. Specific steps are as follows.

Step 801: A service packet processing node located in a cloud gateway sends a correspondence between a location index value and an identifier of the service packet processing node to a packet distribution node located in the cloud gateway.

Specifically, in the foregoing embodiment, a specific process of sending the correspondence between the location index value and the identifier of the service packet processing node by the service packet processing node to the packet distribution node has been described in detail, and details are not described herein.

Step 802: The packet distribution node establishes a location table according to the correspondence between the location index value and the identifier of the service packet processing node.

Specifically, in the foregoing embodiment, a specific process of establishing the location table by the packet distribution node has been described in detail, and details are not described herein.

Step 803: An ePDG sends proxy binding update signaling to the service packet processing node.

Step 804: The service packet processing node establishes a user bearer according to the proxy binding update signaling, and allocates a user bearer index used to identify the user bearer, where the user bearer index includes a location index value, the location index value is used to indicate a location of the service packet processing node in the location table of the packet distribution node, and the location table includes the correspondence between the location index value and the identifier of the service packet processing node.

Specifically, in the foregoing embodiment, a specific process of allocating the location index value to the established user bearer by the service packet processing node has been described in detail, and details are not described herein.

Step 805: The service packet processing node sends proxy binding response signaling to the ePDG, where the proxy binding response signaling carries the user bearer index.

Specifically, the service packet processing node includes the allocated location index value into the user bearer index, further includes the user bearer index into the proxy binding response signaling, and sends the proxy binding update response signaling to the ePDG.

Step 806: The ePDG sends a service packet to the packet distribution node, where the service packet carries the user bearer index.

Specifically, after receiving the proxy binding response signaling, the ePDG obtains the user bearer index from the proxy binding response signaling, and includes the user bearer index into the service packet to send to the packet distribution node.

Step 807: The packet distribution node determines, according to the location index value and the location table, the service packet processing node for processing the service packet.

Specifically, after receiving the service packet, the packet distribution node obtains the location index value from the user bearer index carried in the service packet, and determines, according to the location index value and the location table, the service packet processing node for processing the service packet.

Step 808: The packet distribution node sends the service packet to the determined service packet processing node, so that the service packet processing node performs processing on the service packet.

Optionally, when a service packet processing node in the other service packet processing node(s) in the cloud gateway is to be migrated out of the cloud gateway, the method may further include the following steps:

For differentiating the multiple service packet processing nodes in the cloud gateway, in the following steps, that the service packet processing node is service packet processing node 1 is used an example for description.

Step 809: The service packet processing node receives correspondences that are sent by the other service packet processing node(s) located in the cloud gateway and are between location index values of the other service packet processing node(s) and identifiers of the other service packet processing node(s).

Specifically, service packet processing node 1 receives the correspondences that are sent by the other service packet processing node(s) (for example, service packet processing node 2 and service packet processing node 3) and are between the location index values of the other service packet processing node(s) and the identifier of the service packet processing node, and service packet processing node 1 stores the location index values and the correspondences.

Step 810: The service packet processing node receives a migration message sent by a management node in the cloud gateway, where the migration message includes an identifier of the to-be-migrated-out service packet processing node.

Specifically, when a service packet processing node (for example, service packet processing node 2) in the other service packet processing node(s) (for example, service packet processing node 2 and service packet processing node 3) in the cloud gateway is to be migrated out of the cloud gateway, service packet processing node 1 receives the migration message sent by the management node, where the migration message includes the identifier of the to-be-migrated-out service packet processing node (that is, service packet processing node 2).

Step 811: The service packet processing node determines, according to the identifier of the to-be-migrated-out service packet processing node and the correspondences between the location index values of the other service packet processing node(s) and the identifier of the service packet processing node, a location index value corresponding to the identifier of the to-be-migrated-out service packet processing node.

Specifically, service packet processing node 1 determines the location index value corresponding to the identifier of the to-be-migrated-out service packet processing node (that is, the identifier of service packet processing node 2) according to the identifier of the to-be-migrated-out service packet processing node (that is, the identifier of service packet processing node 2) and the correspondences between the location index values of the other service packet processing node(s) and the identifier of the service packet processing node.

Step 812: The service packet processing node sends a correspondence between the location index value corresponding to the identifier of the to-be-migrated-out serviced packet processing node and an identifier of the service packet processing node to the packet distribution node.

Step 813: The packet distribution node updates, based on the correspondence between the location index value corresponding to the identifier of the to-be-migrated-out service packet processing node and the identifier of the service packet processing node, a correspondence related to the location index value corresponding to the to-be-migrated-out service packet processing node in the location table.

Specifically, after receiving the correspondence between the location index value corresponding to the identifier of the to-be-migrated-out service packet processing node and the identifier of the service packet processing node, the packet distribution node updates, based on the correspondence between the location index value corresponding to the identifier of the to-be-migrated-out service packet processing node and the identifier of the service packet processing node, the correspondence related to the location index value corresponding to the to-be-migrated-out service packet processing node in the location table.

Figure 9:
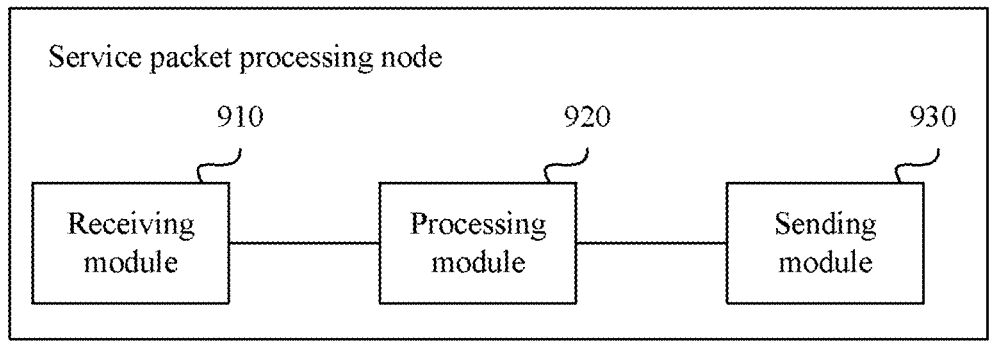
FIG. 9 is a schematic structural diagram of a service packet processing node according to an embodiment of the present disclosure.

The following uses FIG. 9 as an example to describe in detail a service packet processing node provided in an embodiment of the present disclosure. FIG. 9 is a schematic structural diagram of the service packet processing node according to this embodiment of the present disclosure. The service packet processing node is used to implement the service packet distribution method provided in the foregoing embodiment.

As shown in FIG. 9, the service packet processing node includes: a receiving module 910, a processing module 920, and a sending module 930.

The receiving module 910 is configured to receive session request signaling sent by a peer device of a cloud gateway;

the processing module 920 is configured to establish a user bearer according to the session request signaling, and allocate a user bearer index used to identify the user bearer, where the user bearer index includes a location index value, the location index value is used to indicate a location of the service packet processing node in a location table of a packet distribution node located in the cloud gateway, and the location table includes a correspondence between a location index value and an identifier of a service packet processing node; and the sending module 930 is configured to send session response signaling to the peer device, where the session response signaling includes the user bearer index, so that the peer device adds the user bearer index into a service packet when sending the service packet to the packet distribution node, and the packet distribution node determines, according to the location index value and the location table after receiving the service packet, the service packet processing node for processing the service packet.

The location table is established by the packet distribution node according to a correspondence that is sent by the sending module and is between the location index value allocated by the processing module and an identifier of the service packet processing node.

When a service packet processing node in the other service packet processing node(s) in the cloud gateway is to be migrated out of the cloud gateway, the receiving module 910 is further configured to receive a migration message sent by a management node in the cloud gateway, where the migration message includes an identifier of the to-be-migrated-out service packet processing node;

the processing module 920 is further configured to determine a location index value corresponding to the identifier of the to-be-migrated-out service packet processing node according to the identifier of the to-be-migrated-out service packet processing node and correspondences respectively between location index values of the other service packet processing node(s) and identifiers of the other service packet processing node(s); and the sending module 930 is further configured to send a correspondence between the location index value corresponding to the identifier of the to-be-migrated-out service packet processing node and the identifier of the service packet processing node to the packet distribution node, so that the packet distribution node updates a correspondence related to the location index value corresponding to the identifier of the to-be-migrated-out service packet processing node in the location table.

In a 2G network or a 3G network, the cloud gateway is a GGSN, and the peer device is an SGSN; or in a 4G network, the cloud gateway is a P-GW or an S-GW, and the peer device is an MME; or in a 4G roaming network, the cloud gateway is a P-GW or an S-GW, and the peer device is an ePDG.

The user bearer index allocated by the processing module 920 is specifically a TEID or a GRE key.

Some consecutive bits in the user bearer index allocated by the processing module 920 are used to save the location index value.

According to the service packet processing node provided in this embodiment of the present disclosure, the service packet processing node allocates a location index value to an established user bearer, and notifies a peer device of the location index value, so that the peer device includes the location index value into a service packet when sending the service packet to a packet distribution node, and the packet distribution node determines, according to the location index value and a location table, the service packet processing node for processing the service packet. The prior art has the following problem: When performing distribution processing on a service packet, a cloud gateway selects a service packet processing node according to only an IP address carried in the service packet, which is inflexible and easily causes a situation in which the selected service packet processing node cannot perform processing on the service packet, thereby leading to service packet distribution failures of the cloud gateway and reducing a distribution success rate. In the foregoing solutions, the location index value is allocated by the service packet processing node, which resolves the problem in the prior art, implements flexible service packet distribution of the cloud gateway, and improves a service packet distribution success rate of the cloud gateway.

Figure 10:
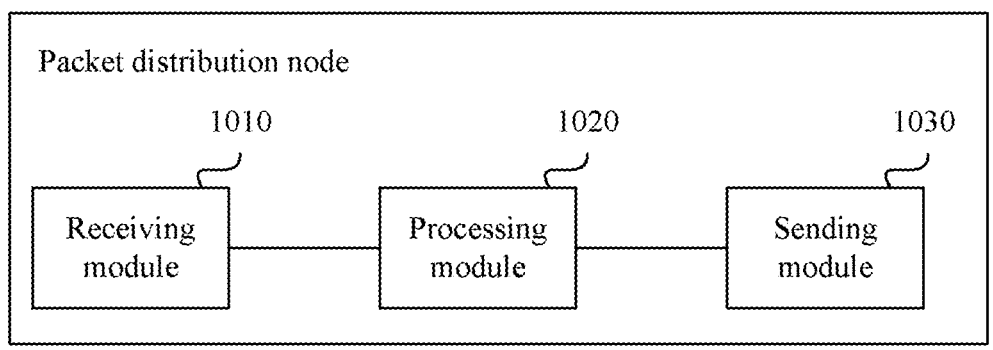
FIG. 10 is a schematic structural diagram of a packet distribution node according to an embodiment of the present disclosure.

The following uses FIG. 10 as an example to describe in detail a packet distribution node provided in an embodiment of the present disclosure. FIG. 10 is a schematic structural diagram of the packet distribution node according to this embodiment of the present disclosure. The packet distribution node is used to implement the service packet distribution method provided in the foregoing embodiment. The packet distribution node is located in a cloud gateway.

As shown in FIG. 10, the packet distribution node includes: a receiving module 1010, a processing module 1020, and a sending module 1030.

The receiving module 1010 is configured to receive a service packet sent by a peer device of the cloud gateway, where the service packet includes a user bearer index, the user bearer index is sent to the peer device by a service packet processing node located in the cloud gateway, the user bearer index includes a location index value, the location index value is used to indicate a location of the service packet processing node located in the cloud gateway in a location table of the packet distribution node, and the location table includes a correspondence between a location index value and an identifier of a service packet processing node;

the processing module 1020 is configured to determine, according to the location index value and the location table, the service packet processing node for processing the service packet; and the sending module 1030 is configured to send the service packet to the determined service packet processing node, so that the service packet processing node performs processing on the service packet.

The location table is established by the processing module according to a correspondence that is sent by the service packet processing node and is between the location index value allocated by the service packet processing node and an identifier of the service packet processing node.

When a service packet processing node in the other service packet processing node(s) in the cloud gateway is to be migrated out of the cloud gateway, the receiving module 1010 is further configured to receive a correspondence that is sent by the service packet processing node and is between a location index value corresponding to an identifier of the to-be-migrated-out service packet processing node and an identifier of the service packet processing node; and the processing module 1020 is further configured to update, based on the correspondence between the location index value corresponding to the identifier of the to-be-migrated-out service packet processing node and the identifier of the service packet processing node, a correspondence related to the location index value corresponding to the to-be-migrated-out service packet processing node in the location table.

In a 2G network or a 3G network, the cloud gateway is a GGSN, and the peer device is an SGSN; or in a 4G network, the cloud gateway is a P-GW or an S-GW, and the peer device is an MME; or in a 4G roaming network, the cloud gateway is a P-GW or an S-GW, and the peer device is an ePDG.

The user bearer index included in the service packet received by the receiving module 1010 is specifically a TEID or a GRE key.

Some consecutive bits in the user bearer index included in the service packet received by the receiving module 1010 are used to save the location index value.

According to the packet distribution node provided in this embodiment of the present disclosure, the packet distribution node determines, according to a location index value and by using a location table, a service packet processing node for processing a service packet. The prior art has the following problem: When performing distribution processing on a service packet, a cloud gateway selects a service packet processing node according to only an IP address carried in the service packet, which is inflexible and easily causes a situation in which the selected service packet processing node cannot perform processing on the service packet, thereby leading to service packet distribution failures of the cloud gateway and reducing a distribution success rate. In the foregoing solutions, the location index value is allocated by the service packet processing node, which resolves the problem in the prior art, implements flexible service packet distribution of the cloud gateway, and improves a service packet distribution success rate of the cloud gateway.

Figure 11:
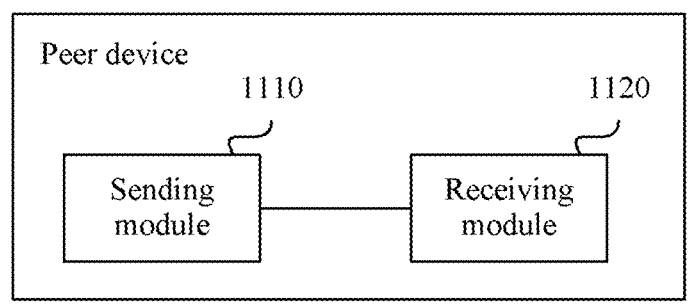
FIG. 11 is a schematic structural diagram of a peer device according to an embodiment of the present disclosure.

The following uses FIG. 11 as an example to describe in detail a peer device provided in an embodiment of the present disclosure. FIG. 14 is a schematic structural diagram of the peer device according to this embodiment of the present disclosure. The peer device is used to implement the service packet distribution method provided in the foregoing embodiment.

As shown in FIG. 11, the peer device includes: a sending module 1110 and a receiving module 1120.

The sending module 1110 is configured to send session request signaling to a service packet processing node located in a cloud gateway; and the receiving module 1120 is configured to receive session response signaling sent by the service packet processing node, where the session response signaling carries a user bearer index, the user bearer index is used to identify a user bearer established according to the session request signaling, the user bearer index includes a location index value, the location index value is used to indicate a location of the service packet processing node in a location table of a packet distribution node located in the cloud gateway, and the location table includes a correspondence between a location index value and an identifier of a service packet processing node; where the sending module 1110 is further configured to send a service packet to the packet distribution node, where the service packet carries the user bearer index, so that the packet distribution node determines, according to the location index value and the location table, the service packet processing node for processing the service packet, and sends the service packet to the service packet processing node for processing the service packet.

In a 2G network or a 3G network, the cloud gateway is a GGSN, and the peer device is an SGSN; or in a 4G network, the cloud gateway is a P-GW or an S-GW, and the peer device is an MME; or in a 4G roaming network, the cloud gateway is a P-GW or an S-GW, and the peer device is an ePDG.

The user bearer index carried in the session response signaling received by the receiving module 1110 is specifically a TEID or a GRE key.

That the user bearer index carried in the session response signaling received by the receiving module 1110 includes a location index value includes:

some consecutive bits in the user bearer index carried in the session response signaling received by the receiving module 1110 are used to save the location index value.

According to the peer device provided in this embodiment of the present disclosure, the peer device includes a location index value allocated by a service packet processing node to an established user bearer into a service packet when sending the service packet to a packet distribution node, so that the packet distribution node determines, according to the location index value and by using a location table, the service packet processing node for processing the service packet. The prior art has the following problem: When performing distribution processing on a service packet, a cloud gateway selects a service packet processing node according to only an IP address carried in the service packet, which is inflexible and easily causes a situation in which the selected service packet processing node cannot perform processing on the service packet, thereby leading to service packet distribution failures of the cloud gateway and reducing a distribution success rate. In the foregoing solutions, the location index value is allocated by the service packet processing node, which resolves the problem in the prior art, implements flexible service packet distribution of the cloud gateway, and improves a service packet distribution success rate of the cloud gateway.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present application are further described in detail. It should be understood that the foregoing descriptions are merely specific implementation manners of the present application, but are not intended to limit the protection scope of the present application. Any modification, equivalent replacement, or improvement made without departing from the spirit and principle of the present application should fall within the protection scope of the present application.

What is claimed is:

1. A method for service packet distribution, wherein the method comprises:
receiving, by a first service packet processing node device in a cloud gateway, a session request signal sent by a peer device of the cloud gateway, wherein the cloud gateway includes a packet distribution node device and a plurality of service packet processing node devices, including the first service packet processing node device;
establishing, by the first service packet processing node device, a user bearer according to the session request signal,
allocating a user bearer index used to identify the user bearer, wherein the user bearer index comprises an allocated location index value, the allocated location index value is associated with the first service packet processing node device in a location table of the packet distribution node device, and the location table comprises corresponding relationships between location index values and identifiers of the service packet processing node devices in the cloud gateway; and
sending, by the first service packet processing node device, a session response signal to the peer device, wherein the session response signal comprises the user bearer index, so that the peer device adds the user bearer index into a service packet when sending the service packet to the packet distribution node device, the packet distribution node device updates the location table to establish a relationship between the allocated location index and a second service packet processing node device among the plurality of service packet processing node devices when the first service packet processing node device is to be migrated out of the cloud gateway, and the packet distribution node device determines, according to the location index value and the location table after receiving the service packet, one of the plurality of service packet processing devices for processing the service packet.

2. The method according to claim 1, wherein the location table is established by the packet distribution node device according to the corresponding relationships that are sent by the service packet processing node devices.

3. The method according to claim 2, further comprising, when a third service packet processing node device is to be migrated out of the cloud gateway:
receiving, by the first service packet processing node device, a migration message sent by a management node in the cloud gateway, wherein the migration message comprises an identifier of the third service packet processing node device;
identifying, by the first service packet processing node device, a target location index value corresponding to the identifier of the third service packet processing node device according to the identifier of the third service packet processing node device and the corresponding relationships between the location index values and the identifiers of the service packet processing node devices; and
sending, by the first service packet processing node device, a corresponding relationship between the target location index value and an identifier of another service packet processing node device other than the third service packet processing node device to the packet distribution node device, so that the packet distribution node updates a corresponding relationship related to the target location index value in the location table.

4. The method according to claim 1, wherein:
in a $2^{nd}$ generation mobile communications technology (2G) network or a $3^{rd}$ generation mobile communications technology (3G) network, the cloud gateway is a gateway general packet radio service support node (GGSN), and the peer device is a serving general packet radio service support node (SGSN); or
in a $4^{th}$ generation mobile communications technology (4G) network, the cloud gateway is a packet data network gateway (P-GW) or a serving gateway (S-GW), and the peer device is a mobility management entity (MME); or
in a $4^{th}$ generation mobile communications technology (4G) roaming network, the cloud gateway is a packet data network gateway (P-GW) or a serving gateway (S-GW), and the peer device is an evolved packet data gateway (ePDG).

5. The method according to claim 1, wherein the user bearer index is specifically a tunnel endpoint identifier (TEID) or a Generic Routing Encapsulation key (GRE Key).

6. The method according to claim 1, wherein a plurality of consecutive bits in the user bearer index are used to save the allocated location index value.

7. A service packet processing node device that is in a cloud gateway, the could gateway including a packet distribution node device and a plurality of service packet processing node devices, which includes the service packet processing node device as a first service packet processing node, the service packet processing node device comprising:
a memory configured to store software instructions; and
a processor coupled to the memory and configured to execute the software instructions to:
receive a session request signal sent by a peer device of the cloud gateway;
establish a user bearer according to the session request signal;
allocate a user bearer index to identify the user bearer, wherein the user bearer index comprises an allocated location index value, the allocated location index value is associated with the first service packet processing node device in a location table of the packet distribution node device, and the location table comprises corresponding relationships between location index values and identifiers of the service packet processing node devices; and
send a session response signal to the peer device, wherein the session response signal comprises the user bearer index, so that the peer device adds the user bearer index into a service packet when sending the service packet to the packet distribution node, and the packet distribution node updates the location table to establish a relationship between the allocated location index and a second service packet processing node device among the plurality of service packet processing node devices when the first service packet processing node device is to be migrated out of the cloud gateway, and the packet distribution node device determines, according to the location index value and the location table after receiving the service packet, one of the plurality of service packet processing devices for processing the service packet.

8. The service packet processing node device according to claim 7, wherein the location table is established by the packet distribution node device according to the corresponding relationships that are sent by the service packet processing node devices.

9. The service packet processing node device according to claim 8, wherein the processor is further configured to, when a third service packet processing node device is to be migrated out of the cloud gateway:
receive a migration message sent by a management node in the cloud gateway, wherein the migration message comprises an identifier of the third service packet processing node device;
determine a target location index value corresponding to the identifier of the third service packet processing node device according to the identifier of the third service packet processing node device and the corresponding relationships between location index values and the identifiers of the service packet processing node devices; and
send a corresponding relationship between the target location index value and an identifier of another service packet processing node device other than the third service packet processing node device to the packet distribution node device, so that the packet distribution node device updates a corresponding relationship related to the target location index value in the location table.

10. The service packet processing node device according to claim 7, wherein:
in a $2^{nd}$ generation mobile communications technology (2G) network or a $3^{rd}$ generation mobile communications technology (3G) network, the cloud gateway is a gateway general packet radio service support node (GGSN), and the peer device is a serving general packet radio service support node (SGSN); or
in a $4^{th}$ generation mobile communications technology (4G) network, the cloud gateway is a packet data network gateway (P-GW) or a serving gateway (S-GW), and the peer device is a mobility management entity (MME); or
in a $4^{th}$ generation mobile communications technology (4G) roaming network, the cloud gateway is a packet data network gateway (P-GW) or a serving gateway (S-GW), and the peer device is an evolved packet data gateway (ePDG).

11. The service packet processing node device according to claim 7, wherein the user bearer index allocated is specifically a tunnel endpoint identifier (TEID) or a Generic Routing Encapsulation key (GRE Key).

12. The service packet processing node device according to claim 7, wherein a plurality of consecutive bits in the user bearer index are used to save the allocated location index value.

13. A packet distribution node device that is
in a cloud gateway, the could gateway including the packet distribution node device and a plurality of service packet processing node devices, and the packet distribution node device comprising:
a memory configured to store software instructions; and
a processor coupled to the memory and configured to execute the software instructions to:
receive a service packet sent by a peer device of the cloud gateway, wherein the service packet comprises a user bearer index, the user bearer index is sent to the peer device by a first service packet processing node device among the plurality of service packet processing node devices, the user bearer index comprises an allocated location index value, the allocated location index value associated with the first service packet processing node device in a location table of the packet distribution node device, and the location table comprises corresponding relationships between location index values and identifiers of the service packet processing node devices;
update the location table to establish a relationship between the allocated location index and a second service packet processing node device among the plurality of service packet processing node devices when the first service packet processing node device is to be migrated out of the cloud gateway;
determine, according to the location index value and the location table, one of the plurality of service packet processing devices for processing the service packet; and
send the service packet to the determined one of the plurality of service packet processing node devices, so that the determined one of the plurality of service packet processing node devices performs processing on the service packet.

14. The packet distribution node device according to claim 13, wherein the location table is established according to the corresponding relationships that are sent by the service packet processing node devices.

15. The packet distribution node device according to claim 14, wherein the processor is further configured to, when a third service packet processing node device is to be migrated out of the cloud gateway:
receive from the first service packet processing node device a corresponding relationship between a target location index value corresponding to an identifier of the third service packet processing node device and an identifier of another service packet processing node device other than the third service packet processing node device; and
update, based on the corresponding relationship between the target location index value and the identifier of the another service packet processing node device, the location table.

16. The packet distribution node device according to claim 13, wherein:
in a $2^{nd}$ generation mobile communications technology (2G) network or a $3^{rd}$ generation mobile communications technology (3G) network, the cloud gateway is a gateway general packet radio service support node (GGSN), and the peer device is a serving general packet radio service support node (SGSN); or
in a $4^{th}$ generation mobile communications technology (4G) network, the cloud gateway is a packet data network gateway (P-GW) or a serving gateway (S-GW), and the peer device is a mobility management entity (MME); or
in a $4^{th}$ generation mobile communications technology (4G) roaming network, the cloud gateway is a packet data network gateway (P-GW) or a serving gateway (S-GW), and the peer device is an evolved packet data gateway (ePDG).

17. The packet distribution node device according to claim 13, wherein the user bearer index comprised in the service packet received is specifically a tunnel endpoint identifier (TEID) or a Generic Routing Encapsulation key (GRE Key).

18. The packet distribution node device according to claim 13, wherein a plurality of consecutive bits in the user bearer index are used to save the allocated location index value.

* * * * *

UNITED STATES PATENT AND TRADEMARK OFFICE
CERTIFICATE OF CORRECTION

PATENT NO. : 10,225,191 B2
APPLICATION NO. : 15/381158
DATED : March 5, 2019
INVENTOR(S) : Erhua Wu et al.

It is certified that error appears in the above-identified patent and that said Letters Patent is hereby corrected as shown below:

In the Specification

In Column 29, Line 30, delete "1P" and insert -- IP --;

In the Claims

In Column 32, Line 36, Claim 7, delete "could" and insert -- cloud --;

In Column 32, Line 62, Claim 7, after "node," delete "and"; and

In Column 33, Line 61, Claim 13, delete "could" and insert -- cloud --.

Signed and Sealed this
Twenty-eighth Day of April, 2020

Andrei Iancu
*Director of the United States Patent and Trademark Office*